US006701523B1

(12) United States Patent
Hancock et al.

(10) Patent No.: US 6,701,523 B1
(45) Date of Patent: Mar. 2, 2004

(54) V-CHIP PLUS+IN-GUIDE USER INTERFACE APPARATUS AND METHOD FOR PROGRAMMABLE BLOCKING OF TELEVISION AND OTHER VIEWABLE PROGRAMMING, SUCH AS FOR PARENTAL CONTROL OF A TELEVISION RECEIVER

(75) Inventors: Kenneth Hancock, Mashua, NH (US); Thomas Ward, Bedford, MA (US); Douglas Macrae, Weston, MA (US); Jacques Hugon, Bedford, MA (US)

(73) Assignee: Index Systems, Inc., Tortola (VG)

( * ) Notice: Subject to any disclaimer, the term of this patent is extended or adjusted under 35 U.S.C. 154(b) by 0 days.

(21) Appl. No.: 09/398,963

(22) Filed: Sep. 16, 1999

Related U.S. Application Data

(60) Provisional application No. 60/100,575, filed on Sep. 16, 1998.

(51) Int. Cl.[7] .......................... H04N 7/16; H04N 5/445; G06F 3/00; G06F 13/00

(52) U.S. Cl. ............................ 725/25; 725/27; 725/28; 725/30; 725/44; 725/45; 725/46

(58) Field of Search ............................ 725/25, 27, 28, 725/30, 44, 45, 46

(56) References Cited

U.S. PATENT DOCUMENTS 4,896,354 A 1/1990 Inagaki et al.
4,930,160 A 5/1990 Vogel
5,045,947 A 9/1991 Beery
5,068,734 A 11/1991 Beery
5,335,079 A 8/1994 Yuen et al.
5,382,983 A 1/1995 Kwoh et al.
5,465,113 A 11/1995 Gilboy
5,485,518 A 1/1996 Hunter et al.
5,548,345 A 8/1996 Brian et al.
5,550,575 A 8/1996 West et al.
5,583,576 A 12/1996 Perlman et al.
5,610,653 A 3/1997 Abecassis (List continued on next page.)

FOREIGN PATENT DOCUMENTS

WO WO 97/46016 12/1997

OTHER PUBLICATIONS

Tony Atherton; Living with the V–chip; Entertainment, The Ottawa Citizen, Sunday, Mar. 9, 1996, pp. F1–F2, Section F, Ottawa, Canada.

Glen Dickson, How's it Work? The V–chip is based on Closed–captioning Technology, Boradcasting & Cable, Feb. 12, 1996, p. 24.

John Urquhart, Canada Orders TV Industry to Devise Rating System for Use With the V–Chip, The Wall Street Journal, Friday Mar. 15, 1996, A7C, USA.

Statute, Sec. 551. Parental Choice In Television Programming.

*Primary Examiner*—John Miller
*Assistant Examiner*—Michael W. Hoye
(74) *Attorney, Agent, or Firm*—Christie, Parker & Hale, LLP

(57) ABSTRACT

A system for restricting access to television programs comprising an input for accepting cursor movement and selection commands. The system includes a display that depicts a two dimensional matrix composed of rows and columns of tiles, wherein either the rows of tiles or the columns of tiles correspond to overall program ratings and either the rows of tiles or the columns of tiles correspond to specific program content indications and depicts highlighting of individual tiles or groups of tiles based on the cursor movement commands. The system further includes means for blocking or allowing viewing of television programs based on the overall program ratings and specific content ratings of the rows and columns corresponding the highlighted tiles when a selection command is entered into the input.

13 Claims, 26 Drawing Sheets

U.S. PATENT DOCUMENTS

| | | | | | |
|---|---|---|---|---|---|
| 5,619,653 | A | * | 4/1997 | Kawauchi | 709/213 |
| 5,710,815 | A | * | 1/1998 | Ming et al. | 380/241 |
| 5,828,402 | A | | 10/1998 | Collings | |
| 5,969,748 | A | | 10/1999 | Casement et al. | |
| 5,973,683 | A | * | 10/1999 | Cragun et al. | 345/719 |
| 6,037,969 | A | * | 3/2000 | Lim et al. | 380/221 |
| 6,072,520 | A | | 6/2000 | Yuen et al. | |

* cited by examiner

V-CHIP PLUS+IN-GUIDE USER INTERFACE APPARATUS AND METHOD FOR PROGRAMMABLE BLOCKING OF TELEVISION AND OTHER VIEWABLE PROGRAMMING, SUCH AS FOR PARENTAL CONTROL OF A TELEVISION RECEIVER

RELATED APPLICATIONS

This application claims priority in U.S. Provisional Application No. 60/100,575 filed Sep. 16, 1998. The disclosure of U.S. Provisional Application Nos. 60/100,575 and 60/085,401 are incorporated herein by reference as if fully stated here.

FIELD OF THE INVENTION

The present invention relates generally to television and other viewable programming systems, and more particularly, to an apparatus and method that provides an In-Guide user interface for programmable blocking of viewable programs, such as for parental control of a television receiver.

BACKGROUND OF THE INVENTION

The V-Chip System

A system has been proposed in the United States and endorsed by the U.S. Congress commonly known as the V-Chip System. The system involves using the vertical blanking interval ("VBI") of a standard television signal to include a code which indicates one or more rating factors for the program then being aired. These rating factors can include ratings similar to those promulgated by the Motion Picture Association of America (e.g. G, PG, PG-13, R, NC-17) and numerical ratings of individual categories of program nature such as violence, language, nudity and sexual content. A consumer V-Chip television system would allow a consumer to program his or her television system to exclude programs according to their preferred levels of one or more of these rating criteria or alternatively could be programmed to permit only programs having certain levels of content according to these rating categories.

A problem with the V-Chip system, as recognized in an article by T. Atherton, entitled "Living With the V-Chip," The Ottawa Citizen, Entertainment, Section F, pp. F1–F2 (Saturday, Mar. 9, 1996), is that the perceived utility of the V-Chip system to a consumer depends on whether the consumer agrees with the subjective ratings contained in the VBI for most, if not all, programs. The author of this article, who purportedly has been involved in a "Beta-test" of the V-Chip system in Canada, gives two illustrative examples in his article. First, "trash-talk" shows are rated at the lowest possible level for violence and the next lowest level for language and sex categories, even though these shows often contain verbal violence, physical confrontations and graphic verbal sexual discussions. Second, utilizing the overall rating system to exclude this type of program, such as excluding all programs with a rating above PG, results in the blocking out of many programs which the author considers appropriate for viewing and does not wish blocked out, such as the movie Forrest Gump. Although some people may disagree with the author's judgment of the relative harm and worth of particular television programs, the article illustrates, at least, that regardless of how much the ratings providers will be able to adjust and fine tune their ratings system, based upon the majority of consumers' wishes, there will remain a significant portion of the consumer public who will disagree with the rating systems and think that whatever exclusion programming they do will block out desirable programs while not blocking out undesirable programs. Accordingly, improvements on the V-Chip system are needed. One improvement to the V-Chip system is using apparatus and method as described in co-pending U.S. Provisional Patent Application No. 60/076,290 filed on Feb. 27, 1998, titled V-Chip Plus: Parental Control Apparatus and Method, the disclosures of which are hereby incorporated by reference as if set forth in full herein.

Picture-in-picture Display of Television Programs

For a number of years, television receivers have been equipped with picture-in-picture (PIP) capability. In PIP format, the moving, real time images of one television channel are displayed on the background of the screen and the moving, real time images of another television channel are displayed in a PIP window overlaid on a small area of the background. Because two channels are simultaneously displayed by the television receiver, two tuners are required. The viewer enters the PIP mode by pressing a PIP key on the viewer's controller. Then, the viewer can change either the channel of the background or the channel of the PIP by resetting the appropriate tuner. To reverse the background and PIP images, the viewer simply presses a SWAP key. To collapse the PIP window, the viewer again presses the PIP key.

Electronic Television Guides

Television program guides help television viewers select programs to watch. Such television program guides list the available television programs by day of the week, time of day, channel, and program title (text-based television program guides). For many years, text-based television program guides have been published in hard copy form. More recently, as illustrated by Levine Pat. No. 4,908,713, text-based television program guides have begun to take an electronic form. In other words, the schedule of program listings is stored in an electronic memory connected to the television receiver. The program listings are recalled from memory by the viewer on command for display on the television screen. Without PIP technology, text-based television program guides overlay the real-time image of the program being received by the television tuner.

Still Image Picture Augmentation of Text-Based Television Programs

Despite the prevalence of text-based television program guides, many viewers prefer to make their program selections by switching the television tuner from channel to channel in order to observe on the screen the program being received on the respective channels. This process is sometimes called "grazing."

Emanuel Pat. No. 5,161,019 discloses an automated form of channel grazing. A preselected group of channels are sequentially scanned by switching, the tuner of the television receiver from channel to channel. A still image of the program received on each channel is stored in a memory. After all the channels have been scanned, the still images from all of the channels are simultaneously displayed on the television screen. This process gives the viewer more information about the program choices in addition to that obtainable from a textual television program guide, namely still images of the actual programs are displayed.

Simultaneous PIP Display of Real-Time Program Images and Electronic Television Program Schedule Guides In one embodiment of the invention described in co-pending PCT Application PCT/US95/11173 for Method and Apparatus for Displaying Television Programs and Related Text, the disclosures of which are hereby incorporated by reference as if set forth in full herein, real-time images of a television program can be displayed in the PIP window. Simultaneously, a television viewer can use a PIP format for display of television program listings from a program schedule data base in the background. The viewer can select a particular program from the displayed current television program listing and cause the corresponding real-time program images to appear in the PIP window. In another embodiment of the invention described in co-pending PCT Application PCT/US95/11173, a television viewer can use a PIP format for display of future television program listings from a program schedule data base in the background and moving images of a video clip of one of the program listings in the background display selected for example by a cursor.

SUMMARY OF THE INVENTION

The present invention is directed to an apparatus and method that provides for a user interface for programmable blocking, such as for parental control, of viewable programs, such as programs that can be viewed on a television receiver. A memory provides storage of information relating to viewable programming and user defined blocking instructions. A microprocessor generates a blocking command as a function of the information stored in memory. A blocking circuit, such as a blocking circuit which passes a baseband television video signal to a television display, provides blocking of the video signal in response to the blocking command.

DESCRIPTION OF THE DRAWINGS

These and other features, aspects, and advantages of the present invention will become better understood with regard to the following description, appended claims, and accompanying drawings where:

FIG. 1 also displays the Global Block/Unblock option which may be used by the Master/Administrator to temporarily override blocking instruction to allow unblocked viewing and to then re-establish blocking instructions;

The accompanying drawings are in color. Color is used in the Detailed Description of the Invention to describe certain features of the invention; the description of color-designated features corresponds to the accompanying drawings. The colored drawings and the color-corresponding description is used as a method of description of a particular embodiment of the present invention. The present invention is not limited by the particular colors used herein to describe the invention.

DETAILED DESCRIPTION OF THE INVENTION

Figure 1:
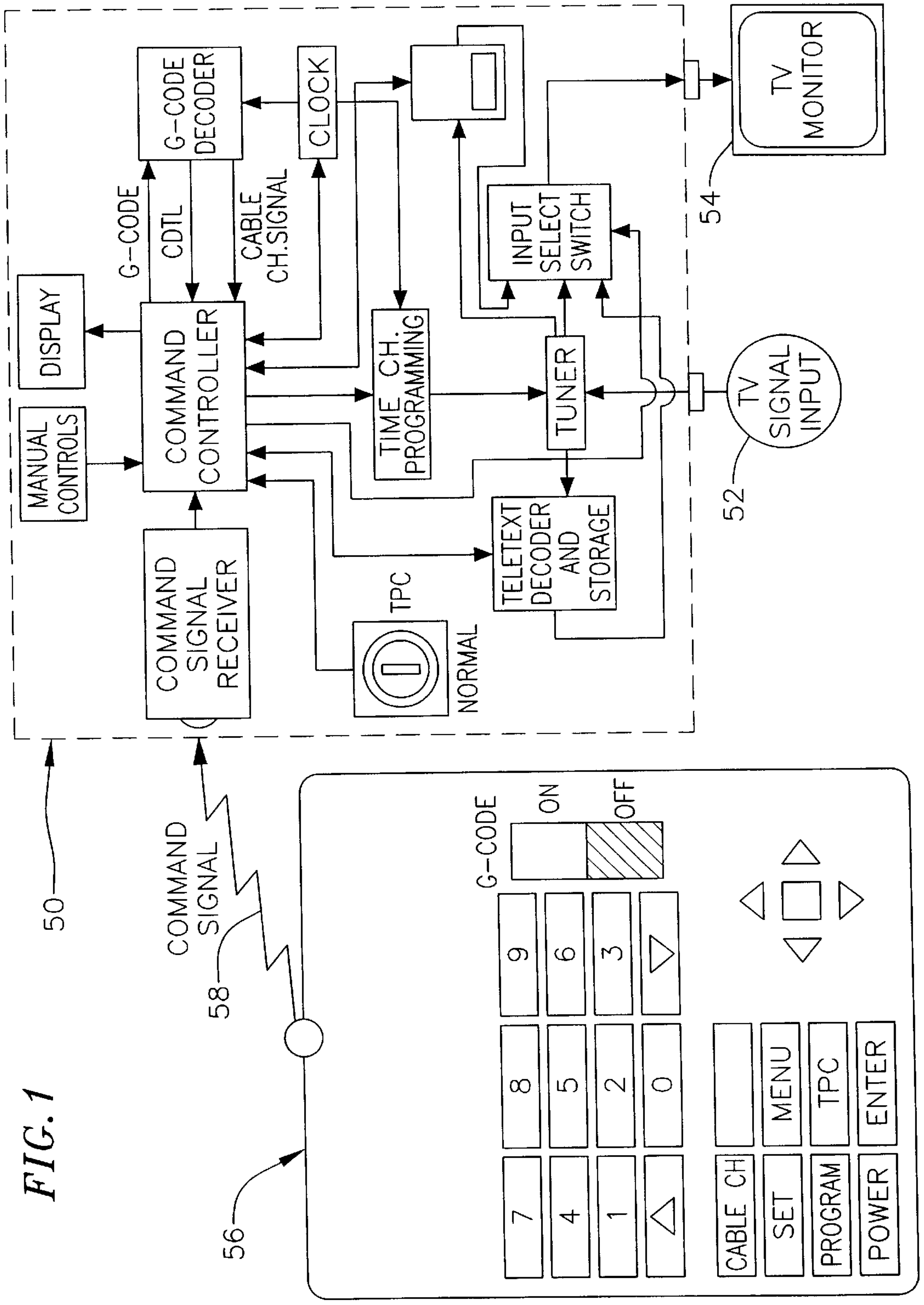
FIG. 1 is a schematic showing one embodiment of an apparatus according to the present invention with parental control circuitry embedded in a video cassette recorder.

One embodiment of the present invention uses PIP display formatting to provide a password-protected programmable viewer interface to block or enable television program viewing, such as for parental control of television viewing. A parental control system is described in U.S. Pat. No. 5,382,983, which is hereby incorporated he reference as if set forth in full herein. Such parental control systems include circuitry for providing parental control of the use of a television receiver. As shown in FIG. 1, the circuitry is generally embedded within a VCR 50 connected between a television signal input 52 and a television monitor or display 54. The parental control circuitry may be controlled by an input or remote controller 56 sending a command signal 58 to the circuitry to permit the user to select either by inclusion or exclusion the particular source and/or programs, channels, dates and times available for television viewing. Co-pending U.S. Provisional Patent Application titled V-Chip Plus: Parental Control Apparatus and Method, the disclosures of which have been previously incorporated by reference as if set forth in full herein, describes a preferred embodiment of the invention disclosed therein as allowing the viewer consumer to override the operation of the V-Chip system or particular programs contained in consumer programmable enable-over-ride lists and blocking-over-ride lists.

The present invention is not limited to the PIP television display format environment. The present invention applies equally to all devices that display viewable programming electronically, including but not limited to devices such as television, digital television, PCTV's, and PC's. Furthermore, the present invention applies equally to all viewable electronic programming display formats, including, but not limited to: display formats that provide partial or complete overlay menus; display formats that allow icons to be displayed on the screen to allow for selection of multiple functions, such as program viewing blocking/enablement, to be simultaneously displayed on the television screen; and display formats that allow the viewer to move the location of the viewing window for the program viewing blocking/enablement selection menus.

Still further, the present invention applies to all viewable programming delivery systems and media, including but not limited to conventional television broadcast, cable television, satellite television, the Internet, the World Wide Web, and all other electronic Ad information networks and electronic viewable programming delivery systems.

Selection of options, functions, actions, programs, channels, logos and all other selection criteria in this invention applies equally to all methods of selection whether by a television viewer's remote control device, by keyboard, by voice activation, by speech recognition, by motion activation, by motion recognition, by mouse, by trac-ball, by touch pad, and/or by all other cursor-control devices.

One embodiment of the present invention allows the viewer, while simultaneously viewing real time television programming, to block, or enable, program viewing using password-based category blocking selection criteria including Global blocking/unblocking, and blocking By Ratings, By Time, By Channel, By Time Allowance, and By $ Allowance. "By Grid Guide Selection" blocking allows the viewer to view real time images of simultaneously broadcast programs, and to view video and sound clips of future programs, listed in an electronic program schedule guide and to set blocking/enablement instructions for individual programs, by channel, and/or by time slot.

After the viewer has selected, as described below, the television program viewing blocking/enablement function ("V-ChipPlus+"), the viewer's screen displays the V-Chip Plus +In-Guide User Interface Main Blocking Menu (the "Main Blocking Menu"). FIG. 1 shows a V-Chip Plus+In-Guide User Interface Main Blocking Menu to block programs by Ratings/content codes, Time, Channel, Time Allowance, Pay-Per-View dollar Allowance and individual programs as selected from the program schedule grid guide or by inputting compressed codes such as a PlusCode™ which is a compressed code used by Gemstar Development Corporation's VCRPlus+® systems and which presently appear in television calendars and may be used to identify particular programs. FIG. 1 also displays the Global Block/Unblock option which may be used by the Master/Administrator to temporarily override blocking instruction to allow unblocked viewing and to then re-establish blocking instructions. The Main Blocking Menu further provides for viewer selection of the Set Passwords option.

The viewer can enter the Main Blocking Menu in a number of ways. One embodiment is that the viewer, at some point in time after turning on the viewer's television receiver, presses a dedicated key on a remote control device. In another embodiment, the viewer enters the Main Blocking Menu by selecting the Blocking Option from the GuidePlus+Grid Guide option bar, causing the Main Blocking Menu to be displayed in the background window of the PIP display (the "PIP embodiment"). The PIP embodiment is reflected throughout the figures to this patent application. If "By Time Allowance" and/or "By $ Allowance" blocking instructions have been set, the Main Blocking Menu will appear when the viewing device, such as a television, is turned on.

In other embodiments, the viewer could enter the Main Blocking Menu in other ways, including but not limited to: 1.) The viewer presses a menu key on the viewer's remote control device that would enter a selection menu for various programming features for the viewer's particular viewing device, such as a television. Program view blocking/enablement would be an option on the viewing device's selection general menu. The viewer could then select program view blocking/enablement from the general menu; 2.) The viewer selects a program viewing blocking/enablement icon on the viewer's viewing device screen by, for instance, moving a cursor to the location of the icon and indicating selection of the program viewing blocking/enablement function.

In another embodiment, the viewer can enter the "Blocking Mode" while in the TV Guide Plus+Grid Guide (the "Grid Guide embodiment") or similar electronic program viewing scheduling guide (the "Grid Guide"). Co-pending U.S. Provisional Patent Application Serial No. 60/053/330, titled EPG with Advertising Messages, the disclosures of which are hereby incorporated by reference as if set forth in full herein, describes as grid guide 22 such an electronic program viewing scheduling guide. In the Grid Guide embodiment, the viewer enters the "Blocking Mode" by selecting the Blocking Mode function, from for instance, the option bar of the Grid Guide.

In another embodiment, the viewer would enter Plus-Code™ numbers of programs to be blocked.

From the Main Blocking Menu, the viewer can select from options that allow the viewer to block or enable viewing of programs globally, or to block or enable viewing of programs by Ratings/content codes, Time, Channel, Time Allowance, Pay-Per-View dollar Allowance and By Grid Guide Selection from an electronic television program schedule grid guide. Once the viewer has set blocking instructions, the blocking instruction database is updated and is accessed by a program viewing blocking system, such as is claimed in co-pending U.S. Provisional Patent Application No. 60/076,290 filed Feb. 27, 1998, titled V-Chip Plus: Parental Control Apparatus and Method, the disclosures of which have been previously incorporated by reference as if set forth in full herein. The program viewing blocking system uses the database program viewing blocking instructions to block a particular user from viewing programs as directed by the blocking instructions.

In one embodiment, the viewer selects a particular option from the Main Blocking Menu by using the arrow keys on the viewer's remote control device to move the highlight bar up or down the Main Blocking Menu selections and by pressing an Enter key, or some other similarly functional key, to select the highlighted option.

Setting User-level Passwords

Figure 2:
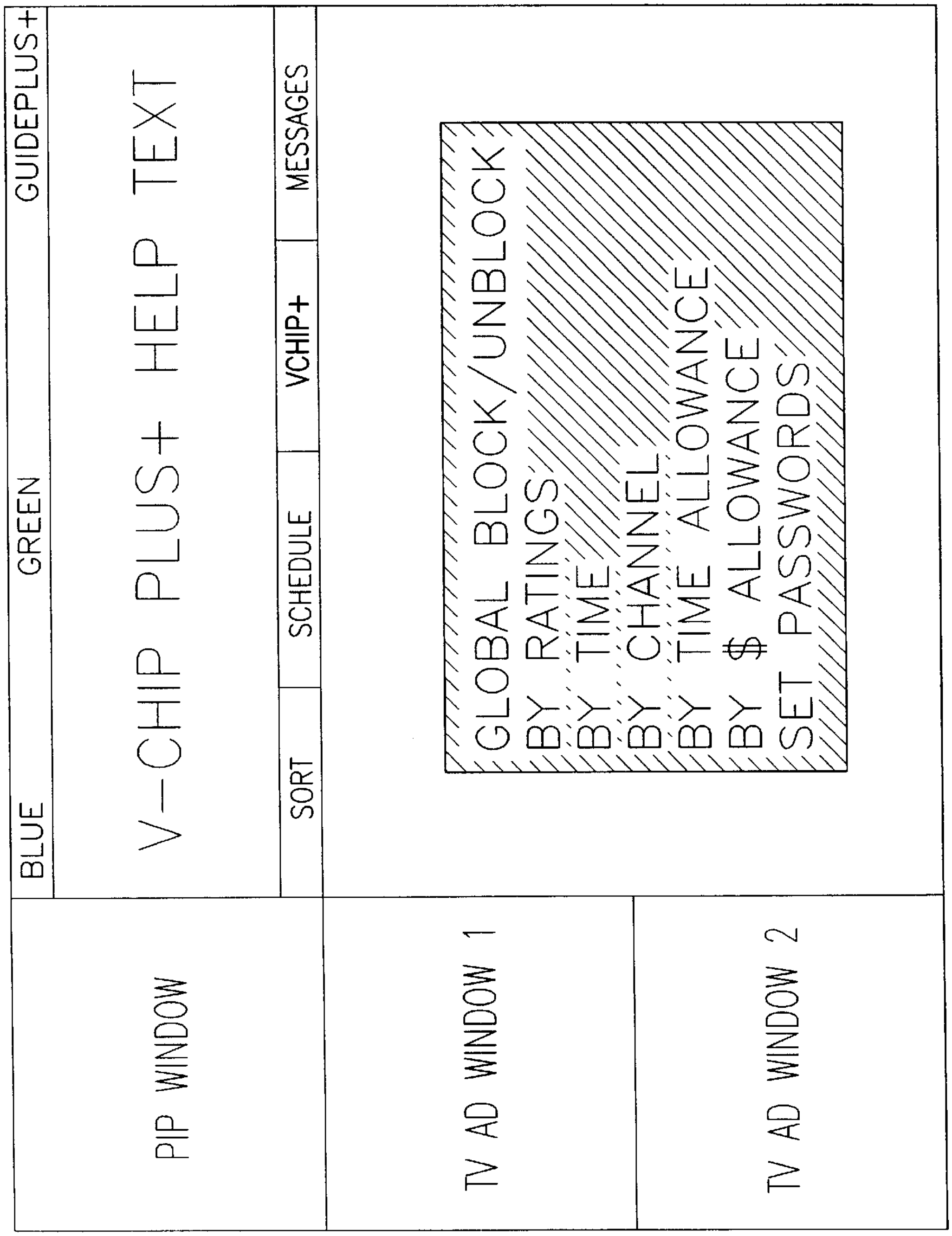
FIG. 2 is a television screen in PIP format displaying password-based options of the V-Chip Plus+In-Guide User Interface Main Blocking Menu to block programs by Ratings/content codes, Time, Channel, Time Allowance, Pay-Per-View dollar Allowance and individual programs as selected from the program schedule grid guide or by inputting compressed codes such as a PlusCode™ which is a compressed code used by Gemstar Development Corporation's VCR Plus+® systems and which presently appear in television calendars and may be used to identify particular programs.
Figure 3:
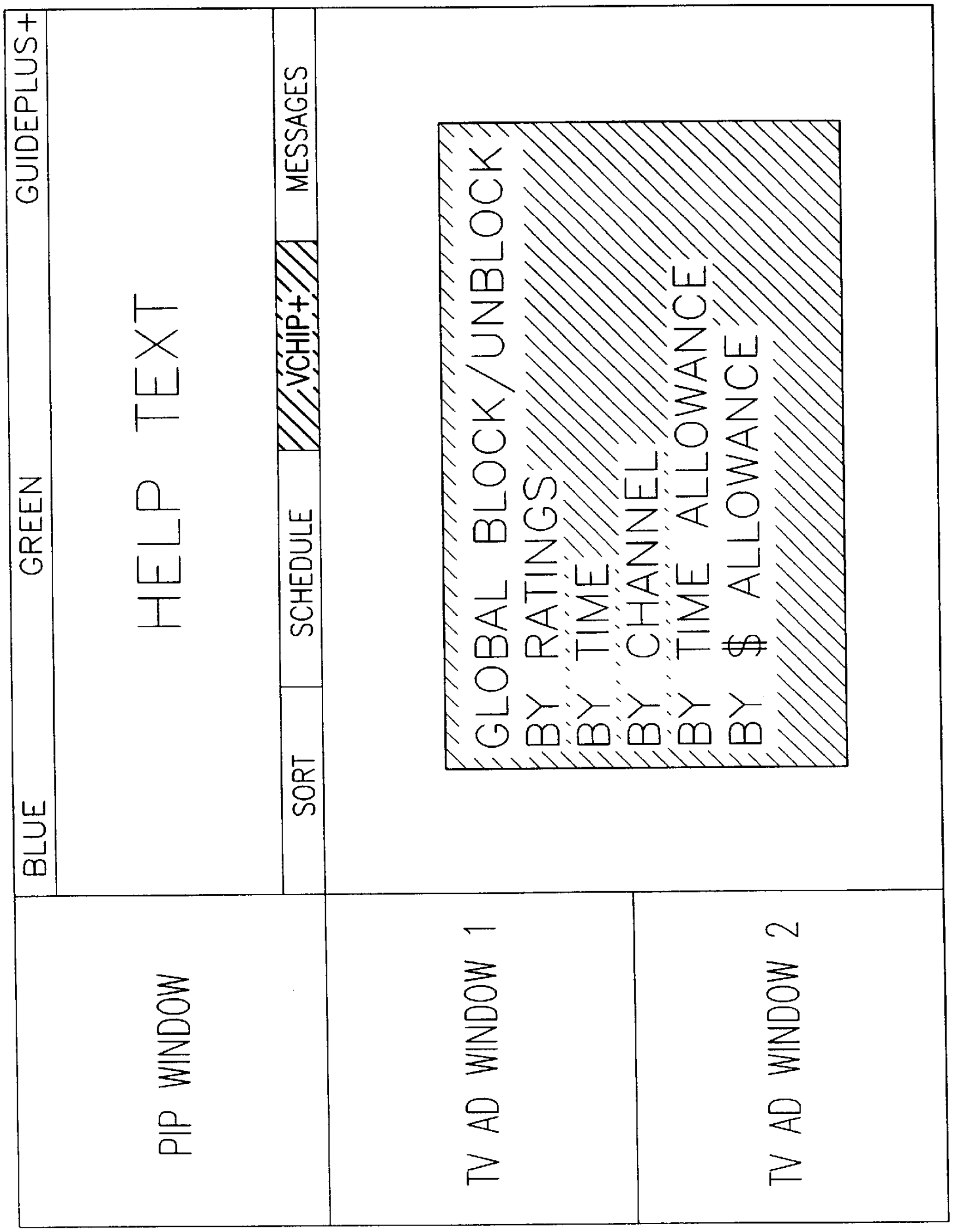
FIG. 3 is a television screen in PIP format displaying a viewer selection from the V-Chip Plus+In-Guide User Interface Main Blocking Menu of the "Set Passwords" option.

V-Chip Plus+provides password-based options to block programs by Ratings/content codes, Time, Channel, Time Allowance, $ Allowance, and by individual program as selected from a program schedule. FIG. 2 shows a television screen in PIP embodiment format displaying a viewer selection from the V-Chip Plus+In-Guide User Interface Main Blocking Menu of the "Set Passwords" option. Turning to FIG. 3, a television screen is shown in PIP format displaying the V-Chip Plus+In-Guide User Interface "Set Password" interface screen and sample viewer-defined users. An alphanumeric password with a plurality of numeric digits may be set up for a plurality of users.

Viewer names can be input by highlighting a "User" tile in the Set Password interface screen. The "user" tiles in FIG. 2 are shown as blue tiles. The viewer can then input the user name by pressing the Blue "Alpha" button on the Guide Plus+display bar and by then using the up/down arrow keys on the viewer's remote control device to scroll up and down the pull down alphabet menu and selecting the appropriate alphabetic characters. In this manner, the viewer selects the alphabetic characters comprising each viewer's name. To designate another viewer's name, the viewer uses the up/down arrow keys on the viewer's remote control device to highlight another blue "User" tile.

Figure 4:
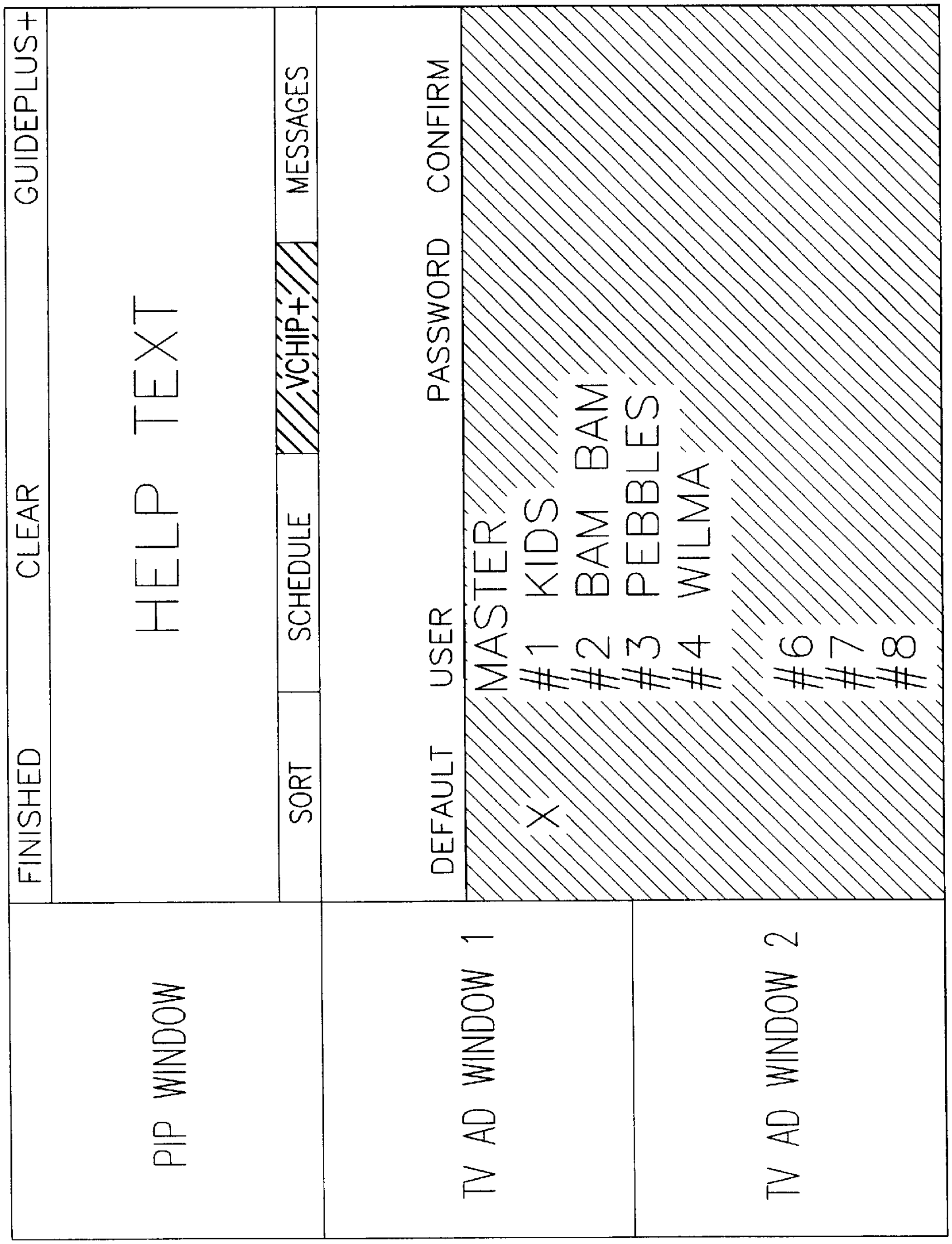
FIG. 4 is a television screen in PIP format displaying the V-Chip Plus+In-Guide User Interface "Set Password" interface screen and sample viewer-defined users.

In the PIP embodiment, the viewer inputs a password for each "User" using the digit keys of the viewer's remote control device and/or the scroll down alphabet menu described above. FIG. 4 shows a television screen in PIP format displaying the V-Chip Plus+In-Guide User Interface "Set Password" interface screen. FIG. 4 shows a sample viewer-defined password selection. A password is not set until the viewer types the password a second time in the Confirm tile for the user specified.

The viewer with the most restrictive Ratings/content settings is automatically set as the default. The default viewer's settings will be used when the television is turned on after the viewer has input the settings.

There may be more than one Master viewer. There may be more than one Administrator viewer. One embodiment of the invention would recognize a hierarchy of viewers. The hierarchy would allow a Master viewer to set blocking instructions for all viewers. The hierarch would allow an Administrator viewer to set blocking instructions for all viewers at a hierarchical level below that of the setting Administrator. Only the viewer designated as a Master or Administrator viewer will have the capability to use the Global Block/Unblock function. In one embodiment, only the highest ranking Master viewer would be allowed the capability to use the Global Block/Unblock function.

Once the viewer completes entering "User" names and passwords, the viewer must press the Blue action "Finished" button on the Guide Plus+screen bar to enter the alpha name into the password database. User names and passwords are not entered into the viewer database until the viewer selects the Blue action "Finished" button. The viewer can select the Blue action "Finished" button after entering each name and after confirming each password. Alternatively, the viewer may enter a plurality of names and passwords before selecting the Blue action "Finished" button. Alternatively, the viewer can press the Green action button to clear the password or alphabetic name inputs so that the viewer can begin inputting the user/password information again. The viewer that is designated as the "Master/Administrator" can turn global settings on or off.

Once the viewer has completed entering "User" names and passwords, the viewer can return to the Main Blocking Menu by using the up/down arrow keys to highlight V-CHIP+on the menu bar.

Blocking from the Grid Guide

In one embodiment, the viewer enters the Grid Guide to identify particular programs to be blocked at the user level. Once in the Grid Guide, the viewer would enter the Blocking Mode by, for example, using the viewer's remote control device to select a Block/Unblock action button on the Grid Guide. Once in the Grid Guide Blocking Mode, the Master/Administrator would navigate through the schedule of programs as provided by the Grid Guide system, such as using the up/down and left/right arrow keys on the viewer's remote control device.

Real time images of real time programs highlighted by the viewer in the Grid Guide will be shown in the PIP or other window of the television screen. Co-pending PCT Application PCT/US95/11173 for Method and Apparatus for Displaying Television Programs and Related Text, the disclosures of which have been previously incorporated by reference as if set forth in full herein, describes one embodiment that provides for the display of real-time images of a television program in the PIP window while simultaneously providing that the television viewer can use a PIP format for display of television program listings from a program schedule data base in the background. The viewer can select a particular program from the displayed current television program listing and cause the corresponding real-time program images to appear in the PIP window.

Video and sound clips of future-scheduled programs highlighted by the viewer in the Grid Guide will be shown in the PIP or other window of the television screen. Co-pending PCT Application PCT/US95/11173, the disclosures of which have been previously incorporated by reference as if set forth in full herein, describes as one embodiment the use by a television viewer of a PIP format for display of future television program listings from a program schedule data base in the background and moving images of a video clip of one of the program listings in the background display selected, for example, by a cursor.

The viewer selects a particular program, channel logo, or time slot to be blocked by one selection method, for instance, using the viewer's remote control device to point to and select a program, channel or time slot. The viewer's selection would be reflected by color coding or other highlighting method.

Then, the viewer sets instructions to block the particular program, channel logo, and/or time slot, using, for instance, the viewer's remote control device to select a blocking action button on the Grid Guide. Pressing the Blue action button will block viewing of the highlighted program. When blocking a particular program, the viewer could further select another action to request the following blocking options: 1.) block a particular episode of a program by title for all occurrences of that program on a particular day for all channels and all times ("Daily Blocking"); 2.) block all occurrences of that program by title for the week for all channels and all time slots ("Weekly Blocking"); 3.) block all occurrences of that program by title for all channels and all time slots ("All Blocking"); and/or 4.) block a particular channel at a particular time slot.

In a Grid Guide embodiment of the present invention, the Grid Guide would show the program title and rating and/or content information.

Ratings or Content Code Blocking

Figure 5:
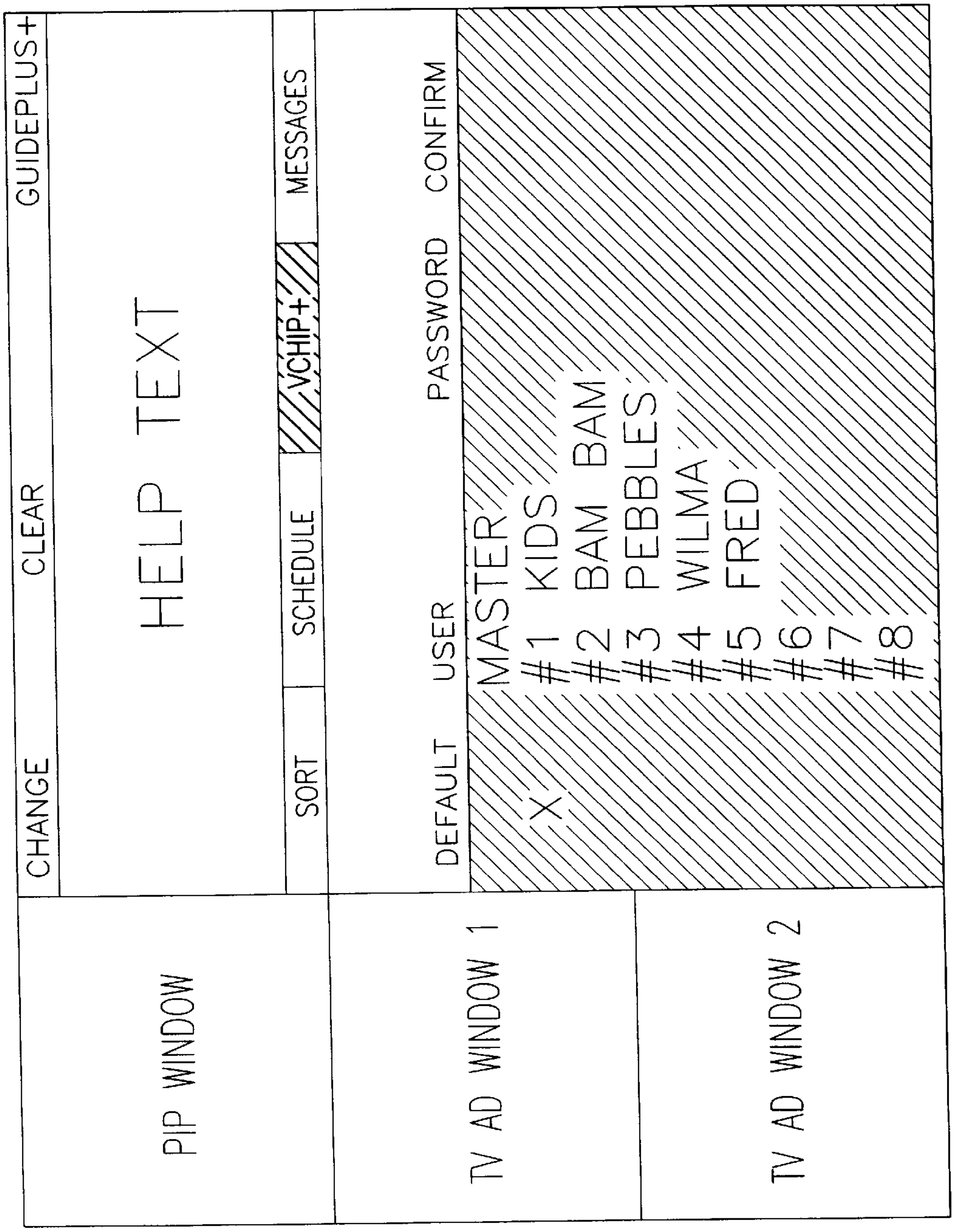
FIG. 5 is a television screen in PIP format displaying the V-Chip Plus+In-Guide User Interface "Set Password" interface screen and a sample viewer-defined password selection.

The "Master/Administrator" user/viewer can block a selected user's access by ratings or content codes. FIG. 5 shows a television screen in PIP format displaying a viewer selection from the V-Chip Plus+In-Guide User Interface Main Blocking Menu of the "By Ratings" option.

After entering the "By Ratings" interface screen, the Master/Administrator selects a user from the user pull down menu. The user pull down menu lists all of the users entered in the user database. The Master/Administrator uses the up/down arrow keys on the Master/Administrator's remote control device to scroll up and down the user pull down menu. The Master/Administrator selects a particular user's name. The Master/Administrator must then enter the appropriate password for the Master/Administrator. When the password is accepted, the password tile turns green. Password acceptance is required to allow the Master/Administrator access to the Rating/Content tiles.

The Master/Administrator then uses the up/down arrow keys to scroll through the various Rating and Content codes. The Rating or Content code tile that can be selected is the tile that is highlighted in blue. The V-Chip Help Text portion of the Guide Plus+screen provides help explanations for the feature currently highlighted by the remote control selection. The V-Chip Help Text provides an explanation of each Rating or Content code as the Rating or Content code tile is highlighted.

Figure 6:
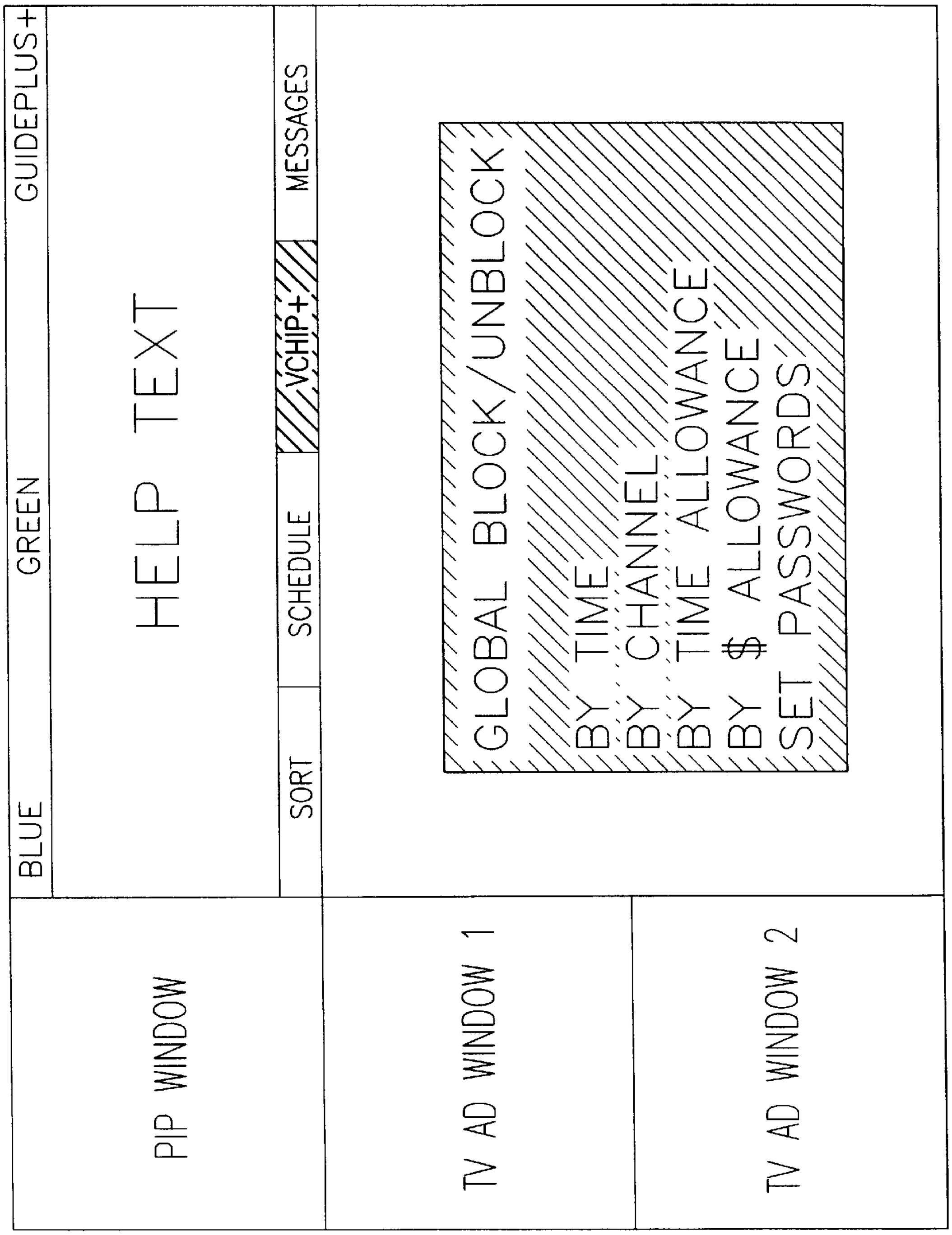
FIG. 6 is a television screen in PIP format displaying a viewer selection from the V-Chip Plus+In-Guide User Interface Main Menu of the "By Ratings" option.

The Master/Administrator presses the Blue action button on the Guide Plus+task bar to select a particular Rating or Content code to be blocked. When the Master/Administrator selects a particular Rating or Content code to be blocked, the tile for that particular code turns red. If the Master/Administrator wants to enable a blocked Rating or Content code, the Master/Administrator selects that particular Rating or Content code and presses the Blue action button on the Guide Plus+task bar, which will return the tile for the particular Rating or Content code to green. FIG. 6 shows a television screen in PIP format displaying the V-Chip Plus+In-Guide User Interface "By Ratings" interface screen and sample viewer-defined blocking selections. FIG. 6 also demonstrates the Help Text explanation for the highlighted Rating code, "NC-17." Pressing the Green action button on the Guide Plus+Task Bar clears all settings on this screen.

Figure 23:
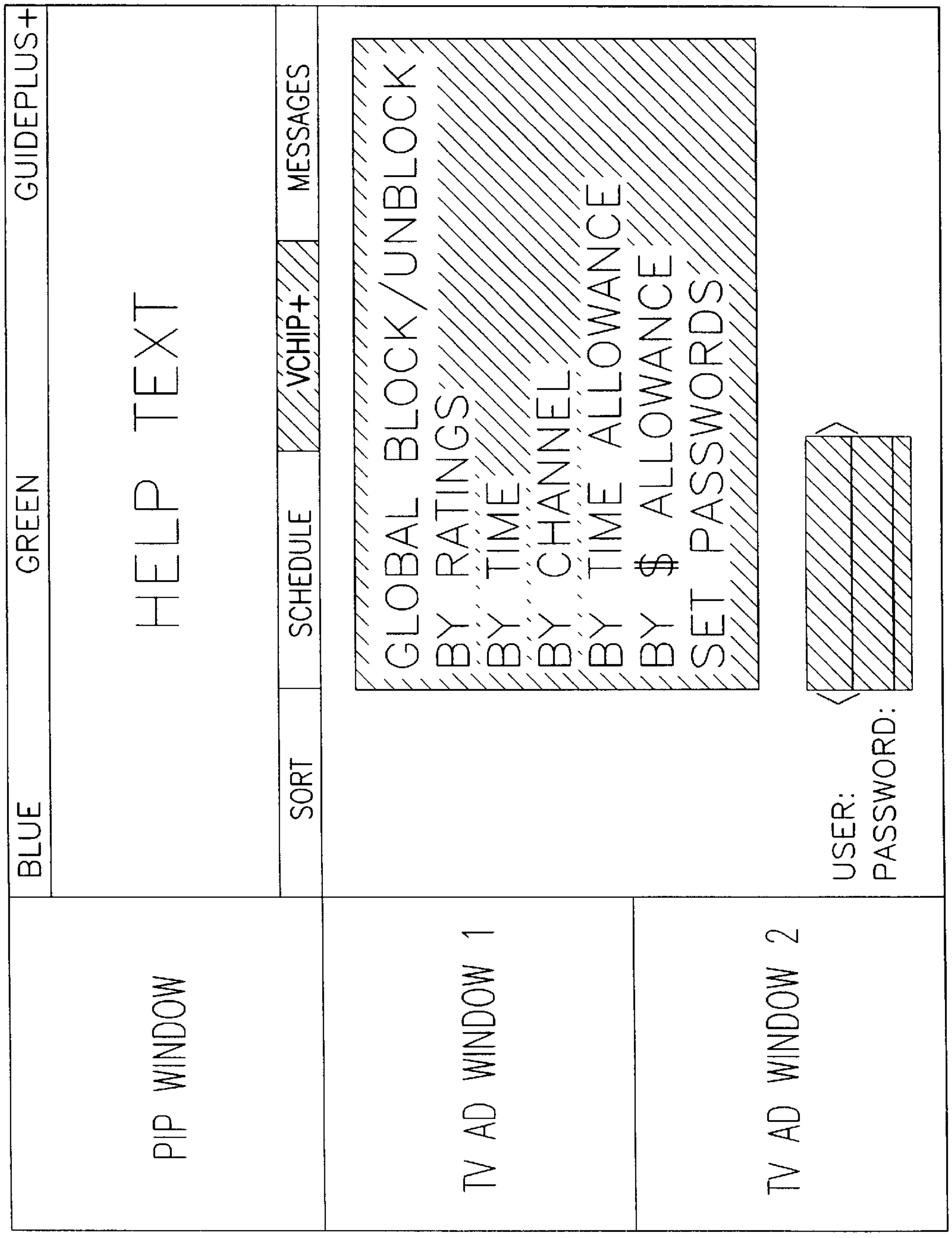
FIG. 23 is a television screen in PIP format displaying a sample V-Chip Plus+In-Guide User Interface Main Blocking Menu format that will appear after any Time Allowance or $ Allowance blocking has been set.

An alternative embodiment of the "By Ratings" interface is represented in FIGS. 23*a* and 23*b*. FIG. 23*a* demonstrates the use of a "By Ratings" grid for TV ratings codes and content codes. FIG. 23*b* demonstrates the use a "By Ratings" interface for MPAA Ratings Codes.

In FIG. 23*a*, all possible TV Ratings Codes ("TV-Y", "TV-Y7", etc.) are listed, in this case, on the left side of the grid 110. Alternatively, MPAA Rating codes, other rating codes or combinations of different rating codes, such as MPAA and TV Ratings Codes may be used in the place of just TV Ratings Codes. Also listed is a grid row for "Unrated" programs 112. That is, the Master/Administrator can chose to block all programs that are not rated. All possible TV Content Codes, ("S" for Sex, "V" for Violence, "L" for Language, etc.) or a subset thereof are listed, in this case, across the top of the grid 114. Each grid tile represents a particular combination of a TV Ratings Code and a TV Content Code. The Master/Administrator uses the up/down and left/right arrow keys on the viewer's remote control device to highlight a grid tile. When the appropriate grid tile is highlighted, the Master/Administrator presses the Blue action button on the Guide Plus+task bar to select that particular Rating/Content Code grid tile to be blocked. When the Master/Administrator selects a particular Rating/Content Code grid tile to be blocked, the grid tile for that particular code turns red, or some other color to indicate selection of that tile. In FIG. 23*a*, tiles 100 and 102 are have been highlighted, selected and turned red (or some other color) to indicate they have been selected. Thereafter, programs that are rated TV-PG and have either L or V content codes will be blocked.

In addition to selecting individual tiles, entire rows or columns are highlighted for possible selection by moving the highlighted tile with the up/down and left/right arrow keys on the viewer's remote control device to the header row 114 or header (first) column 110. Thus, entire TV Ratings Codes rows or entire TV Content Codes can be selected with on press of the Blue action button.

If the Master/Administrator wants to enable a blocked Rating/Content Code grid tile, the Master/Administrator selects that particular Rating or Content Code grid tile and presses the Blue action button on the Guide Plus+task bar, which will return the grid tile for the particular Rating/Content Code tile to green.

If the uppermost, leftmost tile is highlighted, the entire grid of tiles can be selected by one press of the Blue action button. This selection allows the Master/Administrator to select the tiles that the Master/Administrator wants to allow rather than selecting the tiles that the Master/Administrator want to block.

Currently, TV Content codes do not apply to MPAA Rating Codes. Accordingly, FIG. 23*b* demonstrates that the Master/Administrator can chose any of the MPAA Rating Code grid tiles to select that Rating Code for blocking/enablement. As with FIG. 23*a*, FIG. 23*b* provides a grid tile to block/enable unrated programs.

The Master/Administrator can then select another user name and set Ratings and Content code blocking and/or enablement instructions for each user subsequently selected. Changes are accepted when the Master/Administrator leaves the "By Ratings" interface screen by returning to the Main Blocking Menu.

Figure 7:
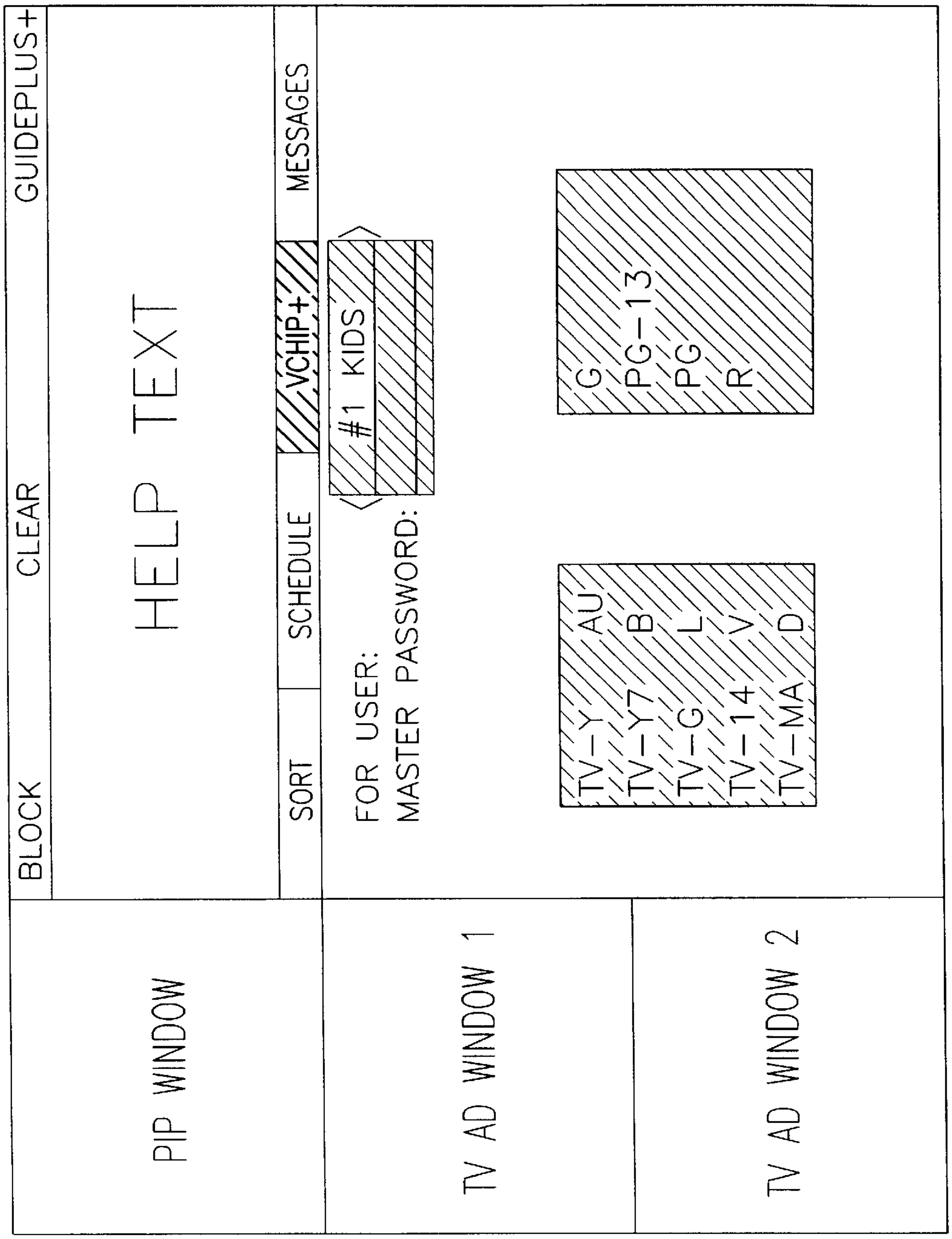
FIG. 7 is a television screen in PIP format displaying the V-Chip Plus+In-Guide User Interface "By Ratings" interface screen and sample viewer-defined blocking selections.

Once the viewer has completed entering "By Rating" blocking and/or enablement instructions, the viewer can return to the Main Blocking Menu by using the up/down arrow keys to highlight V-CHIP+ on the menu bar. The "By Ratings" tile on the Main Blocking Menu will be RED, indicating that Ratings Blocking instructions have been set. FIG. 7 shows a television screen in PIP format displaying confirmation that Ratings Blocking instructions have been set by RED highlighting on the V-Chip Plus +In-Guide User Interface Main Blocking Menu of the "By Ratings" option.

"By Time" Blocking

Figure 8:
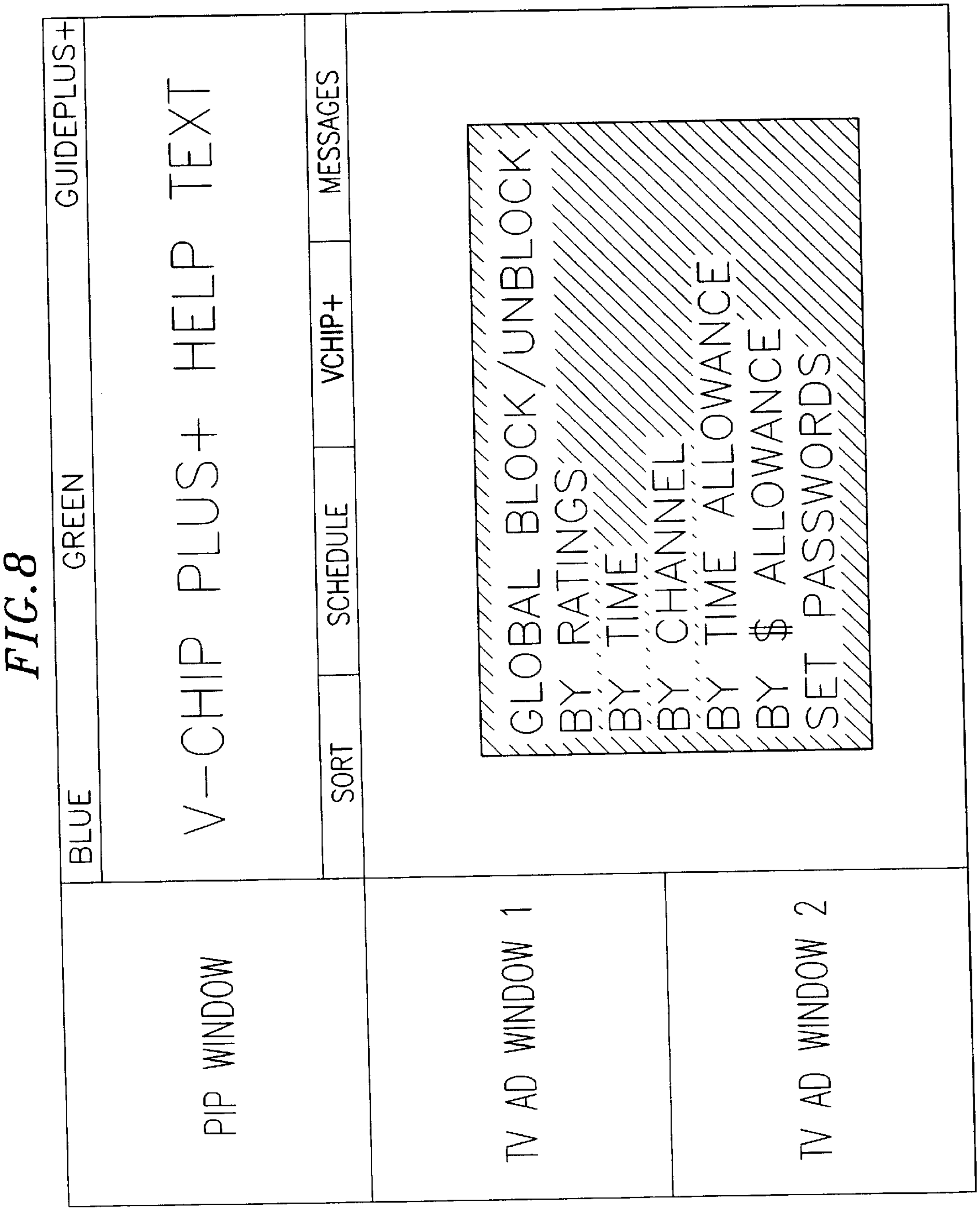
FIG. 8 is a television screen in PIP format displaying confirmation that Ratings Blocking has been set by RED highlighting on the V-Chip Plus+In-Guide User Interface Main Blocking Menu of the "By Ratings" option.
Figure 9:
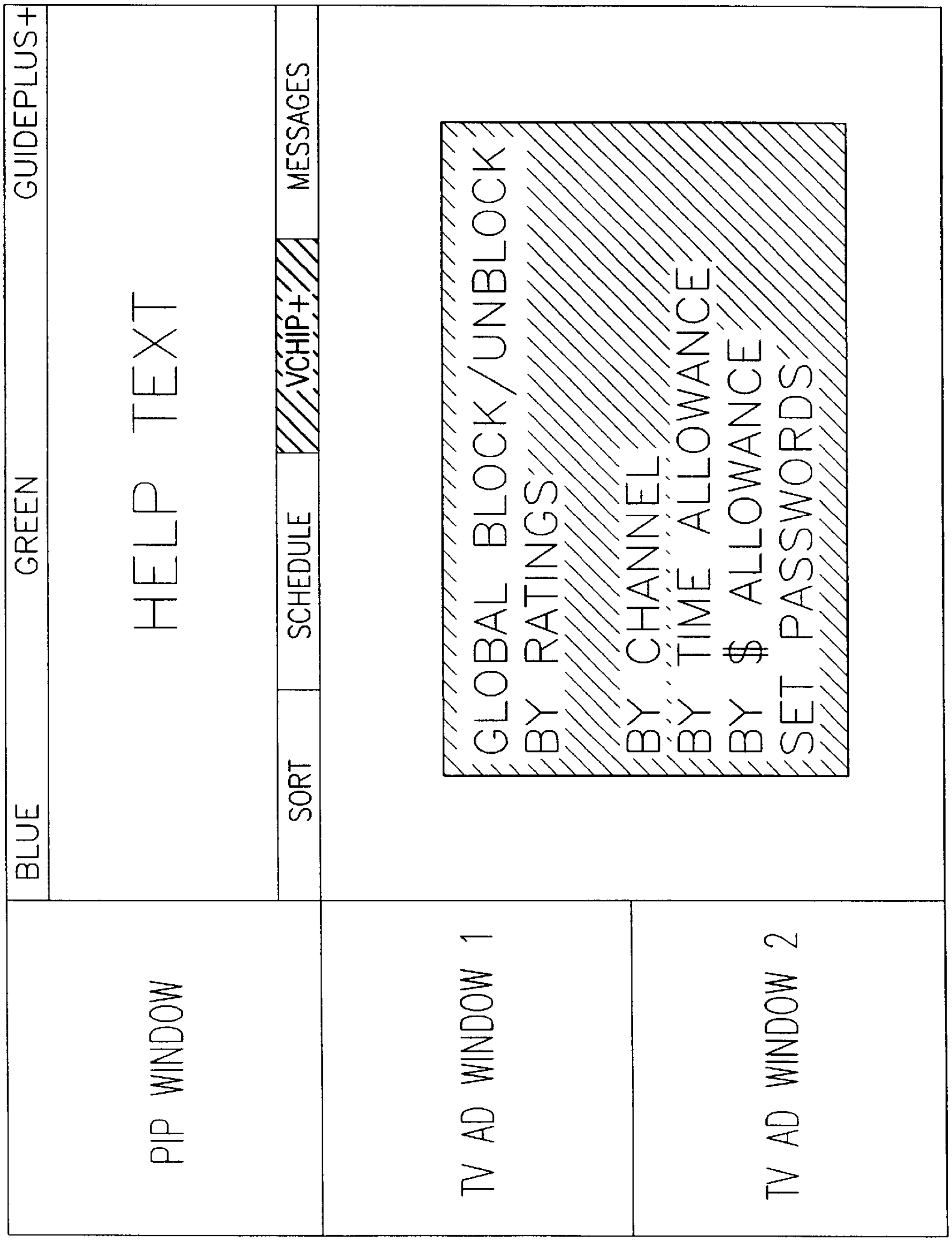
FIG. 9 is a television screen in PIP format displaying a viewer selection from the V-Chip Plus+In-Guide User Interface Main Blocking Menu of the "By Time" option.

The Master/Administrator can set user-level instructions to block program viewing for particular time ranges, for particular days of the week, or for "All Days." FIG. 8 shows a television screen in PIP format displaying a viewer selection from the V-Clip Plus+In-Guide User Interface Main Blocking Menu of the "By Time" option. By selecting the "By Time" option, the user enters the "By Time" interface screen. FIG. 9 shows a television screen in PIP format displaying the V-Chip Plus+In-Guide User Interface "By Time" interface screen and sample viewer-defined blocking selections.

In the "By Time" interface screen, the Master/Administrator selects a user from the user pull down menu. The user pull down menu lists all of the users entered in the user database. The Master/Administrator uses the up/down arrow keys on the Master/Administrator's remote control device to scroll up and down the user pull down menu. The Master/Administrator selects a particular user's name. The Master/Administrator must then enter the appropriate password for the Master/Administrator. When the password is accepted, the password tile turns green. Password acceptance is required to allow the Master/Administrator access to the Day of the Week and time range tiles.

In the "By Time" interface screen, the Master/Administrator uses the up/down arrow keys to scroll through the various days of the week, or to select the "All Days" feature: The Master/Administrator can then enter time range blocking instructions for the particular day of the week, or for "All Days." The Master/Administrator enters time ranges using the numeric keys on the Master/Administrator's remote control device. The Master/Administrator then selects the am/pm tile and uses the Blue action button on the Guide Plus+task bar to select a.m. or p.m. designation for the identified time range. After the Master/Administrator sets blocking instructions for a time range for a particular day, that day (or the "All Days") tile turns RED. Pressing the Green action button on the Guide Plus+task bar clears all setting on this screen. The V-Chip Help Text portion of the Guide Plus+screen provides help explanations for the feature currently highlighted by the remote control selection.

The Master/Administrator can then select another user name and set Time blocking and/or enablement instructions for each user subsequently selected. Changes are accepted when the Master/Administrator leaves the "By Time" interface screen by returning to the Main Blocking Menu.

Figure 10:
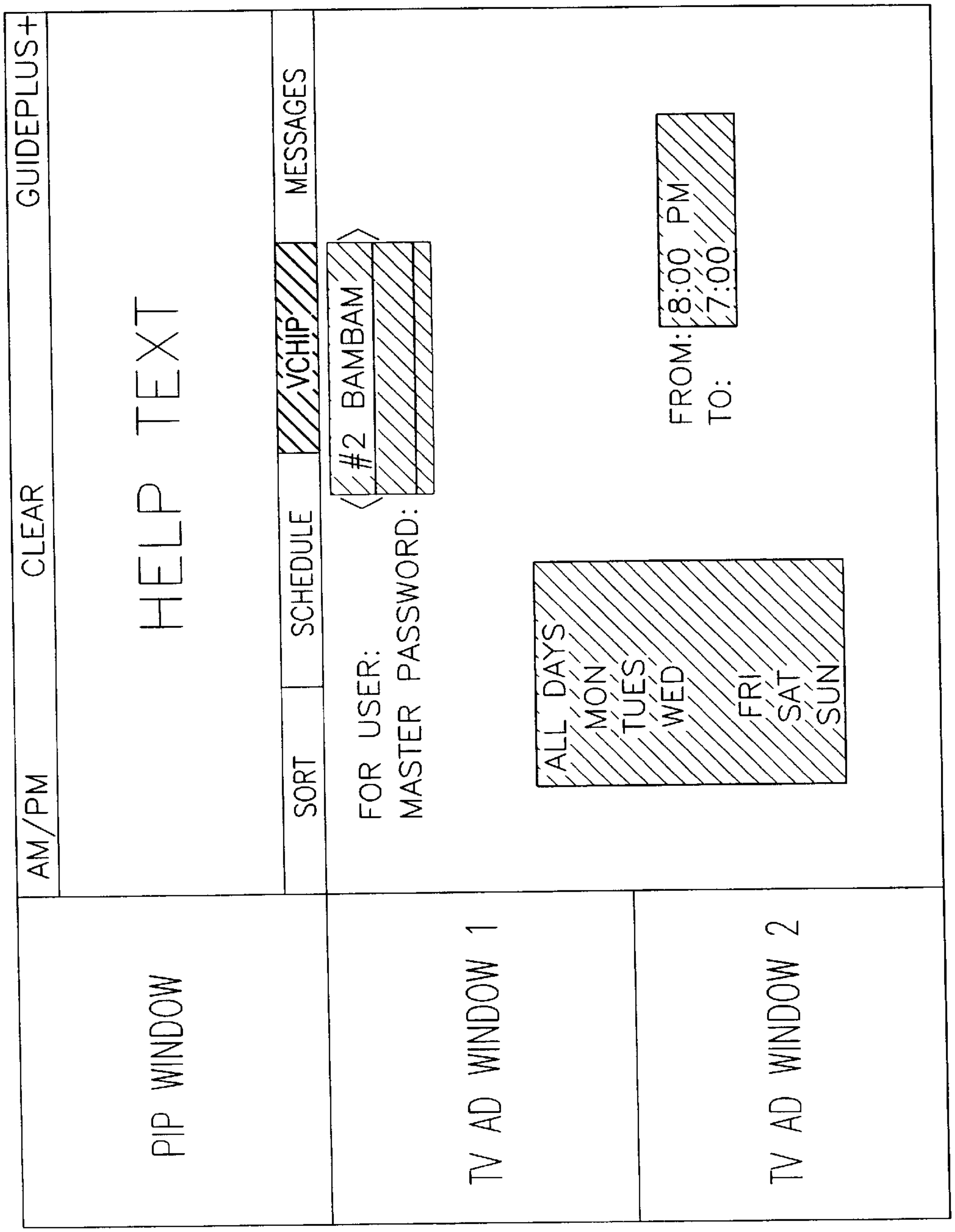
FIG. 10 is a television screen in PIP format displaying the V-Chip Plus+In-Guide User Interface "By Time" interface screen and sample viewer-defined blocking selections.

Once the viewer has completed entering "By Time" blocking and/or enablement instructions, the viewer can return to the Main Blocking Menu by using the up/down arrow keys to highlight V-CHIP+ on the menu bar. The "By Time" tile on the Main Blocking Menu will be RED, indicating that Time Blocking instructions have been set. FIG. 10 shows a television screen in PIP format displaying confirmation that Time Blocking has been set by RED highlighting on the V-Chip Plus+In-Guide User Interface Main Blocking Menu of the "By Time" option.

Figure 24A:
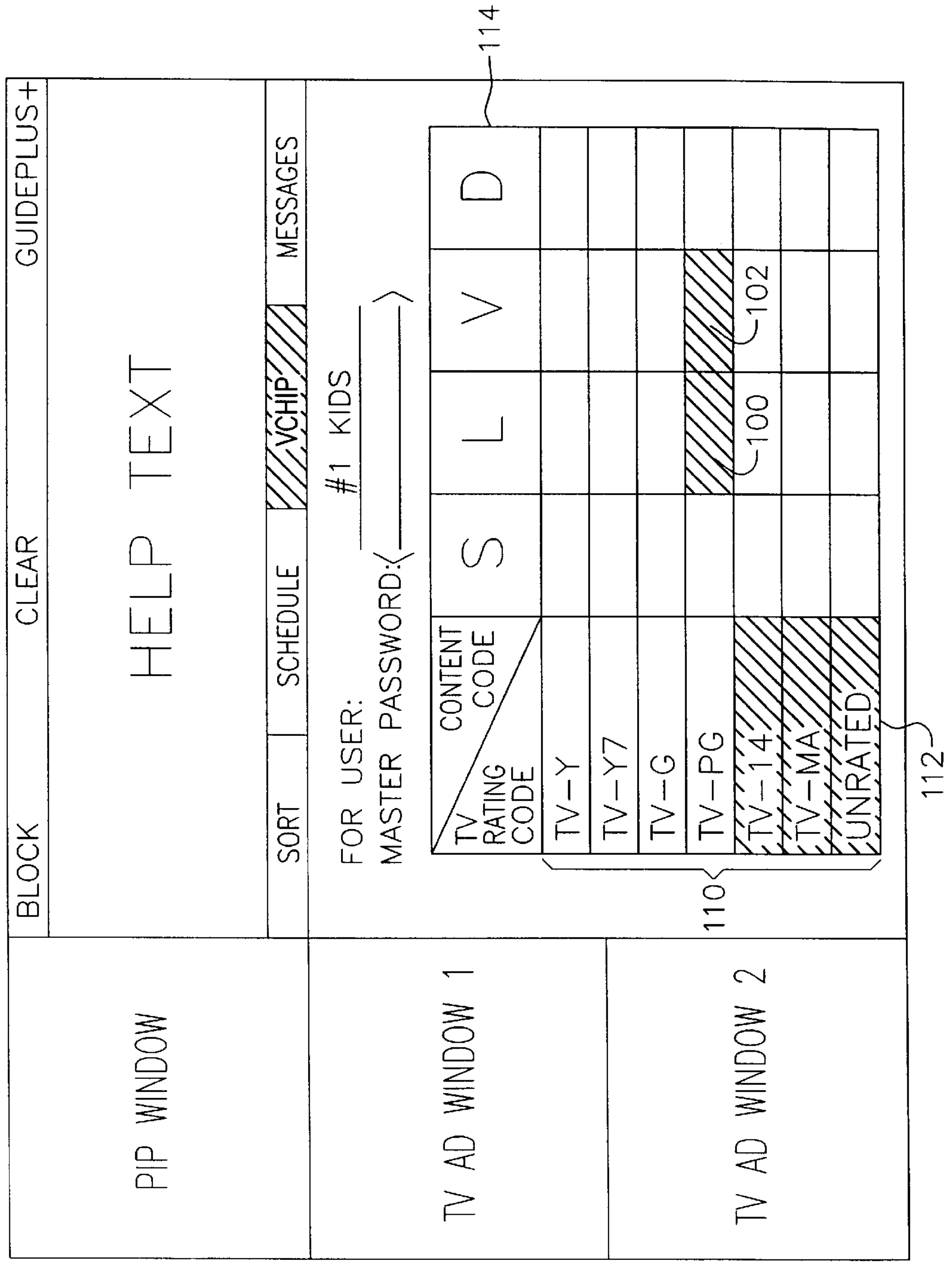
FIG. 24*a* is a television screen in PIP format displaying an alternative embodiment of the V-Chip Plus+In-Guide User Interface "By Ratings" interface screen for TV Ratings Codes and Content Codes in grid format with sample viewer-defined blocking selections.
Figure 24B:
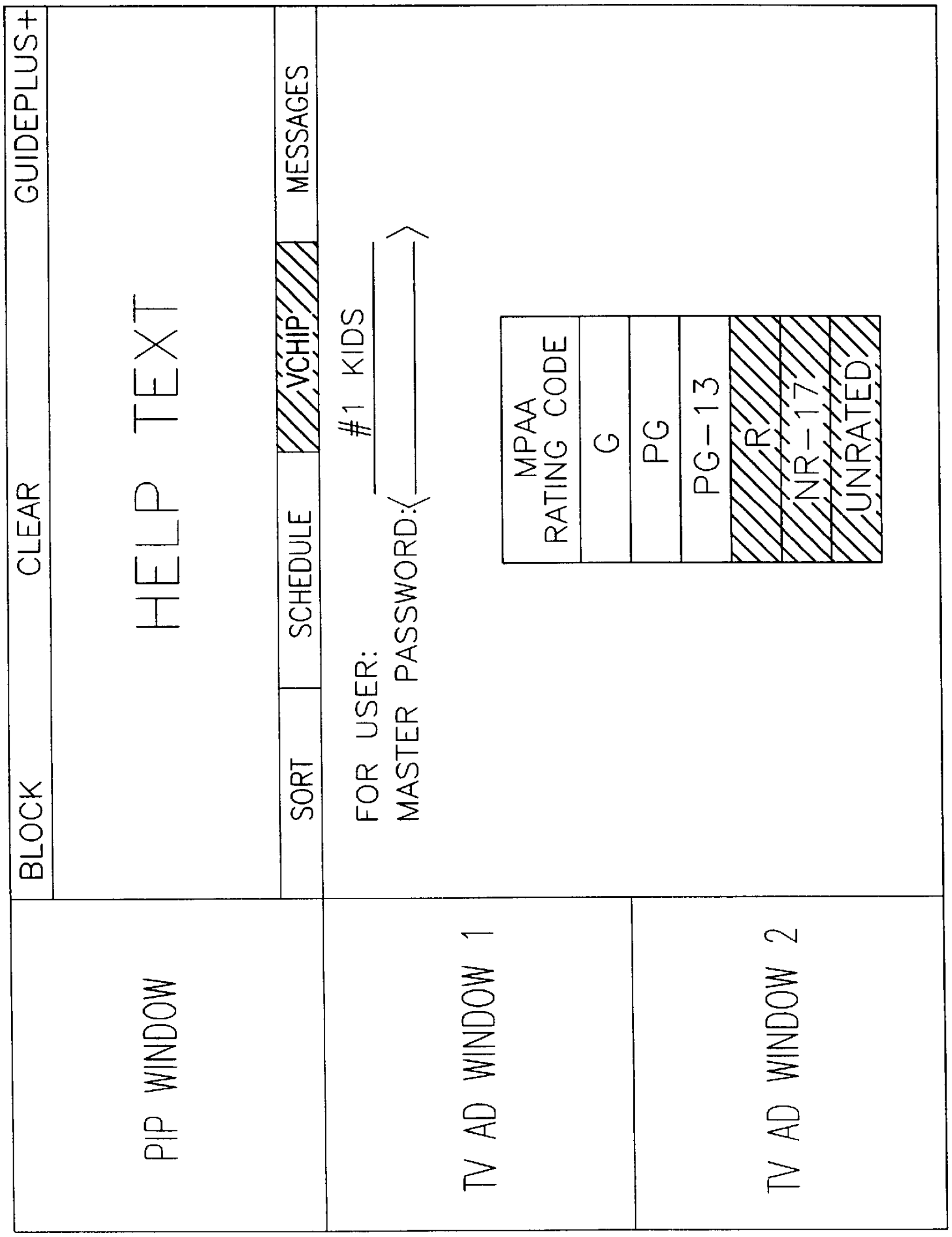
FIG. 24*b* is a television screen in PIP format displaying an alternative embodiment of the V-Chip Plus+In-Guide User Interface "By Ratings" interface screen for MPAA Ratings Codes in grid format with sample viewer-defined blocking selections.
Figure 25:
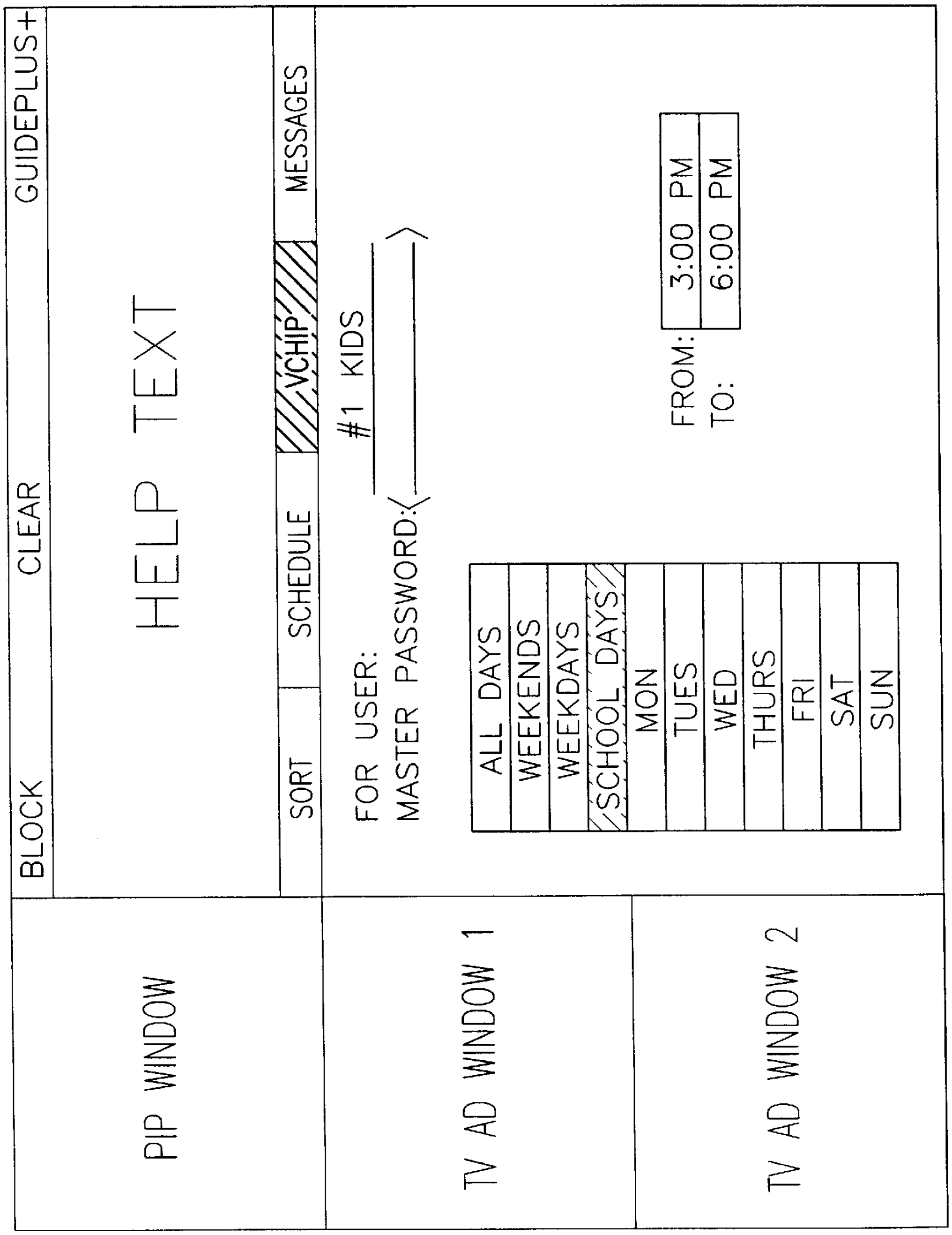
FIG. 25 is a television screen in PIP format displaying an alternative embodiment of the V-Chip Plus+In-Guide User Interface "By Time" interface screen and sample viewer-defined blocking selections.

FIG. 24 is a television screen in PIP format displaying an alternative embodiment of the V-Chip Plus+In-Guide User Interface "By Time" interface screen and sample viewer-defined blocking selections. FIG. 24 provides for the designation by the Master/Administrator of time-sensitive categories such as "School Days," "Weekdays," "Weekends" and/or particular days of the week As an example of"School Day" blocking, if the Master/Administrator blocks the time frame from 8 pm to 7 am of a School Day, then the designated time frame is blocked for Sunday through Thursday. On the other hand, if the Master/Administrator blocks the time frame from 3 pm through 6 pm for School Days, then the designated time frame is blocked for Monday through Thursday. As an example of "Weekend" blocking, if the Master/Administrator blocks the time frame from 6 am through 8 am for Weekends, then the designated time frame is blocked for Saturday and Sunday. If the time frame from 6 pm through 7 pm is blocked for Weekends, then the designated time frame for Friday, Saturday and Sunday would be blocked. The Master/Administrator can further designate blocking for Weekdays (Monday through Friday). Further, a "Saturday/Sunday" option may be offered as an alternative the to the "Weekend" time frame where the "Weekend" time frame generally tracks and is the opposite of the "School Days" time periods. Of course, it is possible to have "School Days" and "Weekends" delineated so that they overlap in some areas while neither cover other specific time periods. Further, "School Days" may further be split into "School Days" and "School Nights," where "School Days" generally refers to Monday–Friday days, while "School Nights" generally refers to Sunday-Thursday nights.

The use of "School Days" (or "School Days" and "School Nights") and "Weekdays" also applies equally to the TV allowance embodiment described above in addition to the blocking functions.

In an alternative embodiment, Holidays, such as national or state holidays, are included in the "Weekend" and "School Days" groupings. Thus, in the United States, the Sunday night before Memorial Day (last Monday in May) would not be part of "School Days" when it otherwise would be. The list of Holidays that would affect the "School Days" and "Weekend" groupings is included into the system by any known data delivery method, including, but not limited to, being included in a factory installed memory, being downloaded over the VBI, a radio signal or other transmission, being downloaded from the Internet or other computer network and being keyed in by the Master/Administrator.

In another alternative embodiment, the School Days/Weekend, or any other generic time periods are combined with other search criteria to search an electronic program guide (EPG) of the type disclosed in PCT Application PCT/US95/11173. Thus, a theme search for "Educational shows" might be restricted to "School Days" where a theme search for "Cartoons" may be restricted to "Weekends."

In another alternative embodiment, the Master/Administrator can choose to block according to Weekend, Weekdays, or specific days of the week. In this embodiment, the Weekend category is defined to be Saturday and Sunday; Weekdays are defined to be Monday through Friday. In this alternative embodiment, neither the Weekend nor the Weekday categories are time-sensitive.

"By Channel" Blocking

Figure 11:
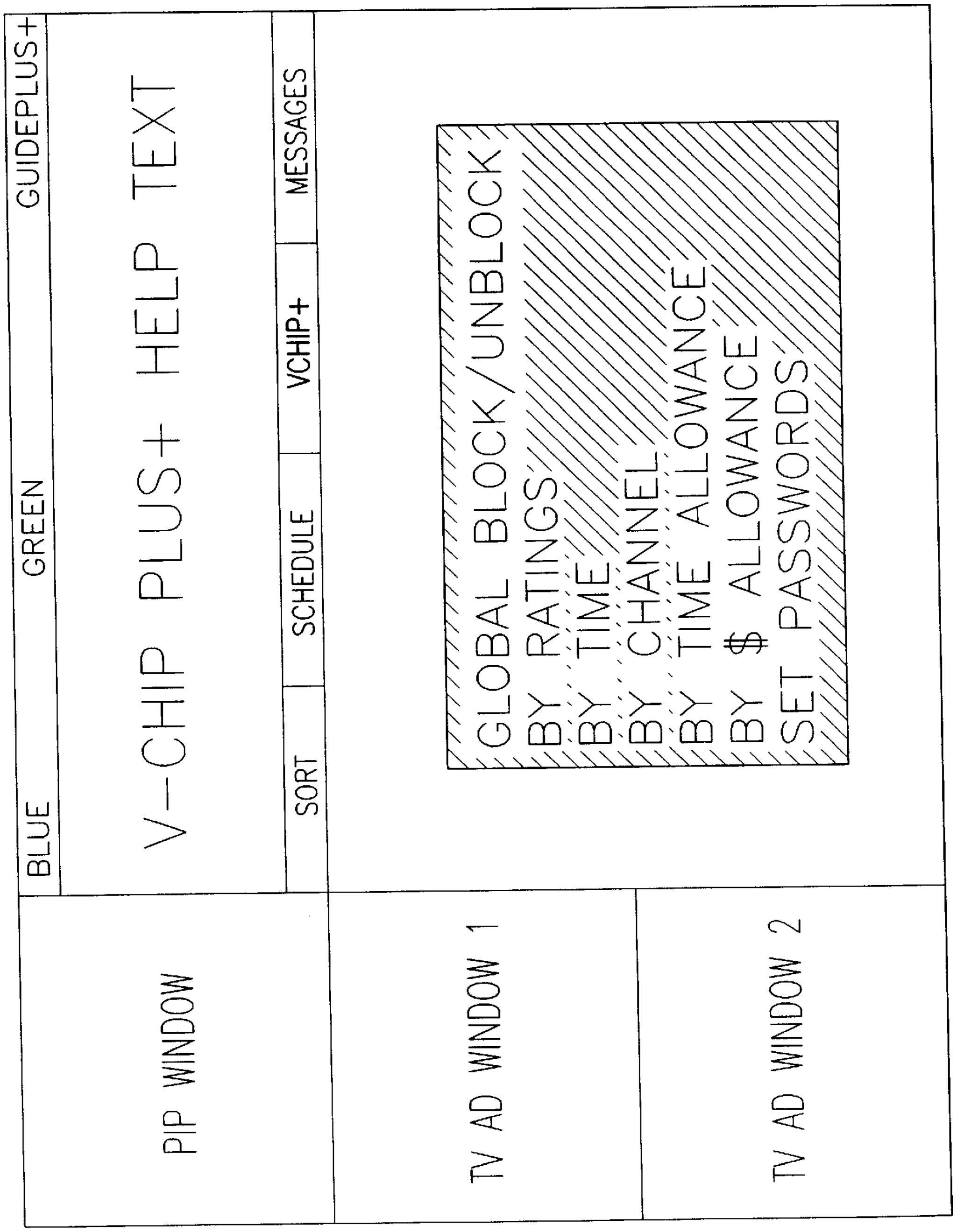
FIG. 11 is a television screen in PIP format displaying confirmation that Time Blocking has been set by RED highlighting on the V-Chip Plus+In-Guide User Interface Main Blocking Menu of the "By Time" option.

The Master/Administrator can set user-level instructions to block program viewing for particular channels, for a group of channels by category, or for a group of shows by "Theme." FIG. 11 shows a television screen in PIP format displaying a viewer selection from the V-Chip Plus+In-Guide User Interface Main Blocking Menu of the "By Channel" option.

Figure 12:
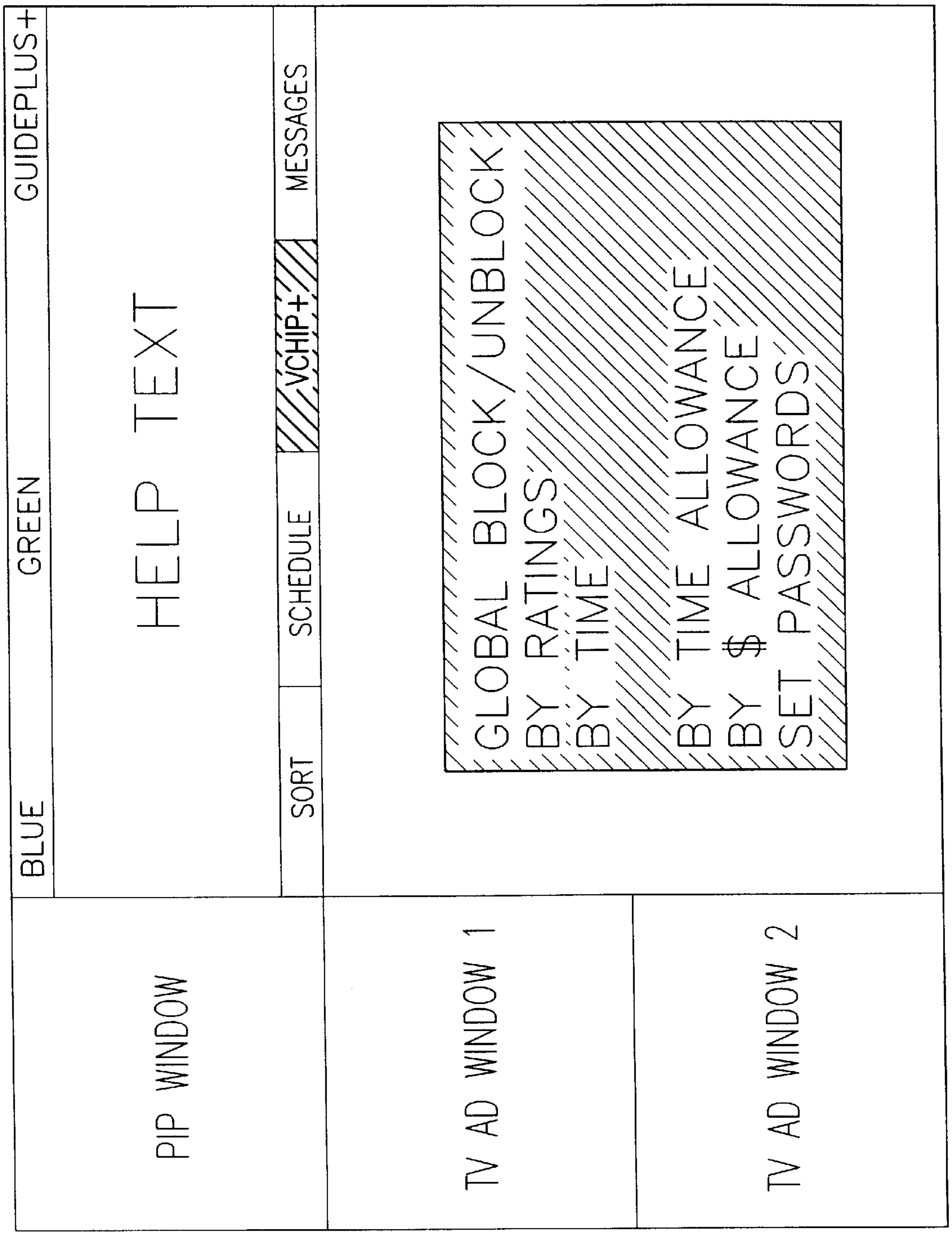
FIG. 12 is a television screen in PIP format displaying a viewer selection from the V-Chip Plus+In-Guide User Interface Main Blocking Menu of the "By Channel" option.

By selecting the "By Channel" option, the user enters the "By Channel" interface screen. FIG. 12 shows a television screen in PIP format displaying the V-Chip Plus+In-Guide User Interface "By Channel" interface screen and sample viewer-defined blocking selections.

In the "By Channel" interface screen, the Master/Administrator selects a user from the user pull down menu. The user pull down menu lists all of the users entered in the user database. The Master/Administrator uses the up/down arrow keys on the Master/Administrator's remote control device to scroll up and down the user pull down menu. The Master/Administrator selects a particular user's name. The Master/Administrator must then enter the appropriate password for the Master/Administrator. When the password is accepted, the password tile turns green. Password acceptance is required to allow the Master/Administrator access to the Channel and Theme tiles.

In the "By Channel" interface screen, the Master/Administrator uses the up/down and left/right arrow keys to scroll through the various channels and "Themes." The Master/Administrator uses the Blue action button on the Guide Plus+task bar to select each channel or Theme to be blocked, or enabled. The tile for a blocked channel or Theme turns RED. The tile for an enabled channel or Theme turns Green. Pressing the Green action button on the Guide Plus+task bar clears all settings on this screen. Data for blocked channels will be stored in memory so it may be viewed if a channel is unblocked. The V-Chip Help Text portion of the Guide Plus+screen provides help explanations for the feature currently highlighted by the remote control selection.

The Master/Administrator can then select another user name and set Channel or Theme blocking and/or enablement instructions for each user subsequently selected. Changes are accepted when the Master/Administrator leaves the "By Channel" interface screen by returning to the Main Blocking Menu.

Figure 13:
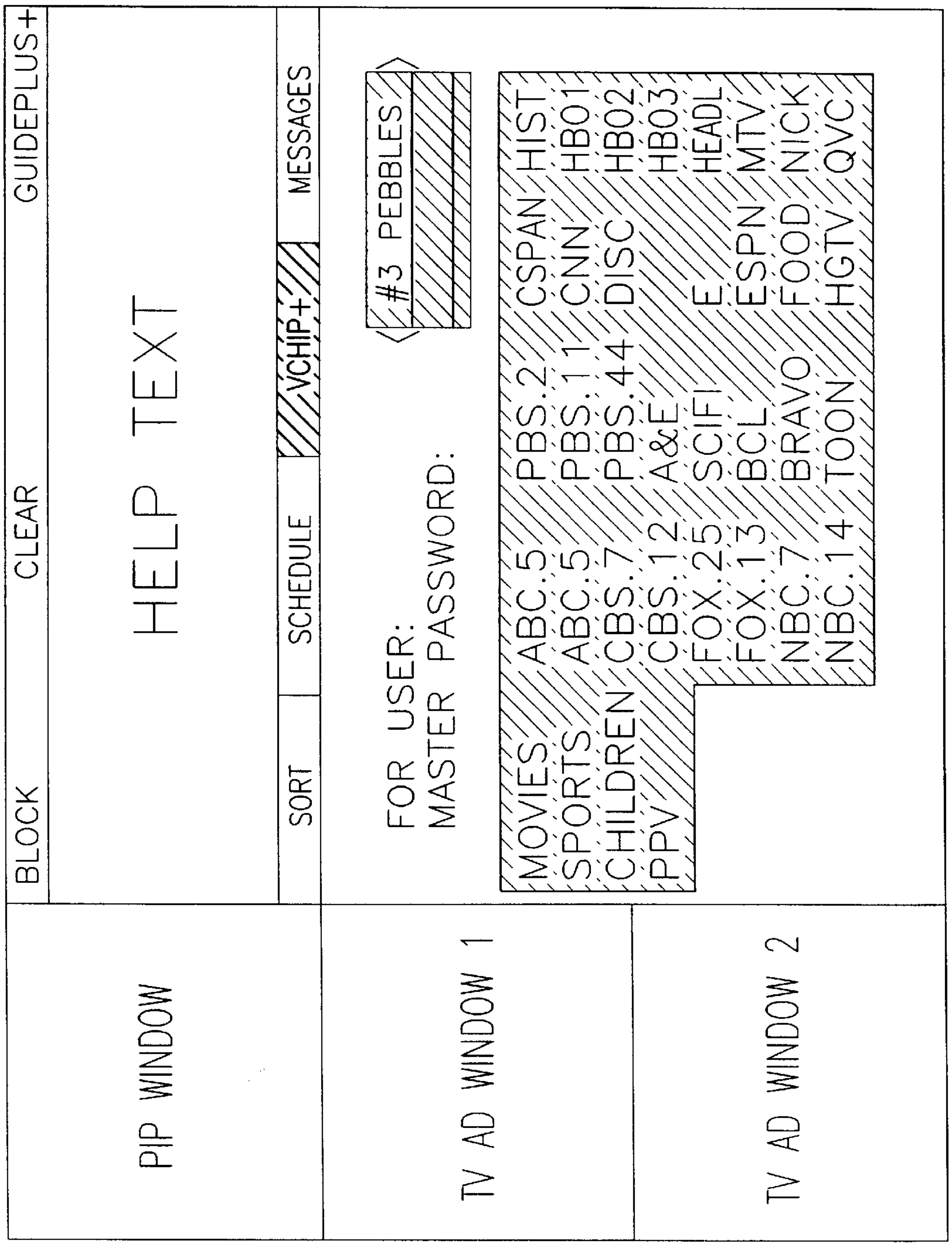
FIG. 13 is a television screen in PIP format displaying the V-Chip Plus+In-Guide User Interface "By Channel" interface screen and sample viewer-defined blocking selections.

Once the viewer has completed entering "By Channel" blocking and/or enablement instructions, the viewer can return to the Main Blocking Menu by using the up/down arrow keys to highlight V-CHIP+ on the menu bar. The "By Channel" tile on the Main Blocking Menu will be RED, indicating that Channel and/or Theme Blocking instructions have been set. Turning to FIG. 13, a television screen is shown in PIP format displaying confirmation that Channel Blocking has been set by RED highlighting on the V-Chip Plus+In-Guide User Interface Main Blocking Menu of the "By Channel" option.

"By Time Allowances" Blocking

Figure 14:
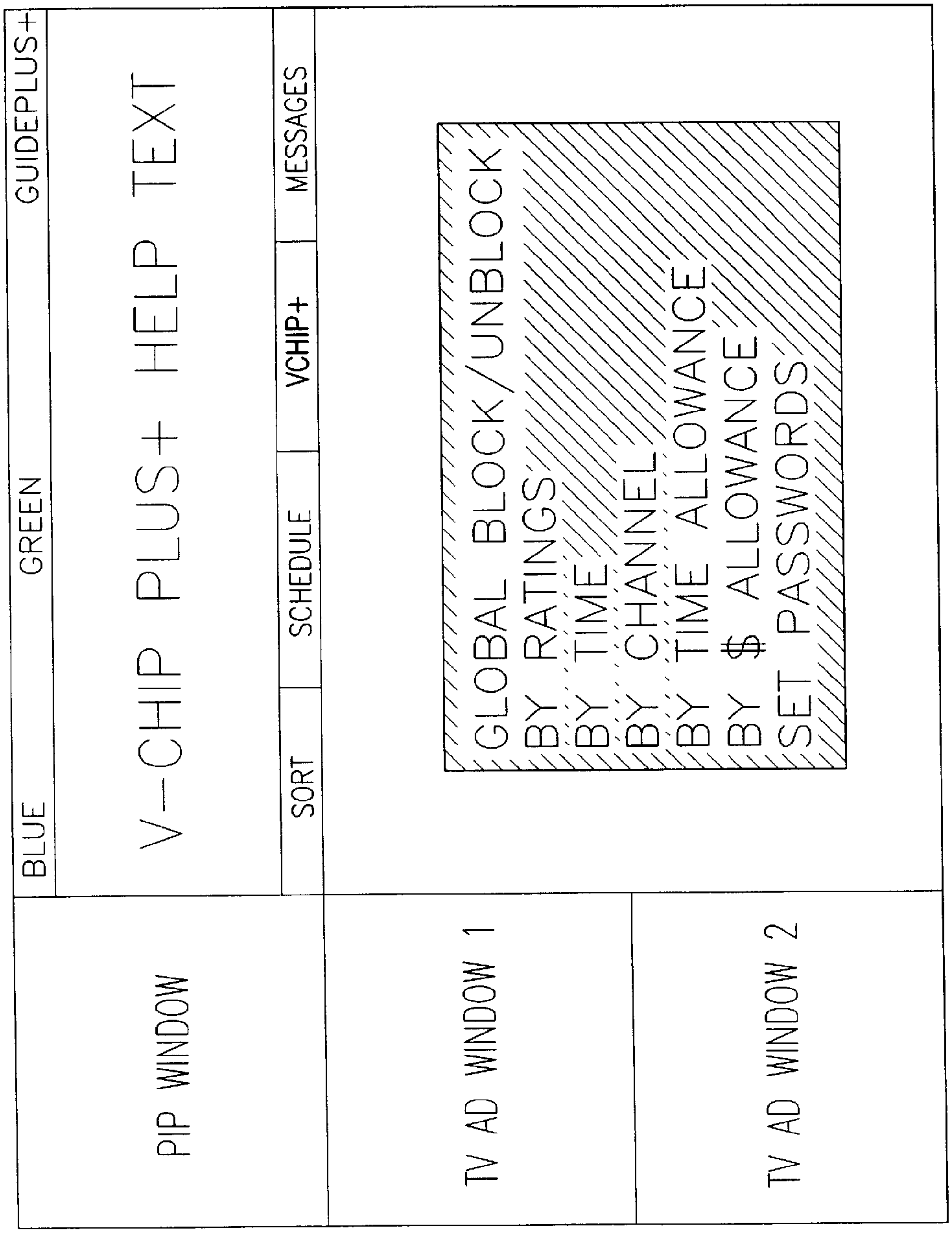
FIG. 14 is a television screen in PIP format displaying confirmation that Channel Blocking has been set by RED highlighting on the V-Chip Plus+In-Guide User Interface Main Blocking Menu of the "By Channel" option.

The Master/Administrator can set user-level viewing time allowances for each user by day of the week or for an entire week. Television viewing will be blocked if the daily viewing time by the viewing user exceeds the time allowance for the particular day of the week for that user. Television viewing will be blocked if the summation of the daily viewing time by the viewing user exceeds the weekly time allowance for that user. FIG. 14 shows a television screen in PIP format displaying a viewer selection from the V-Chip Plus+In-Guide User Interface Main Blocking Menu of the "By Time Allowance" option.

Figure 15:
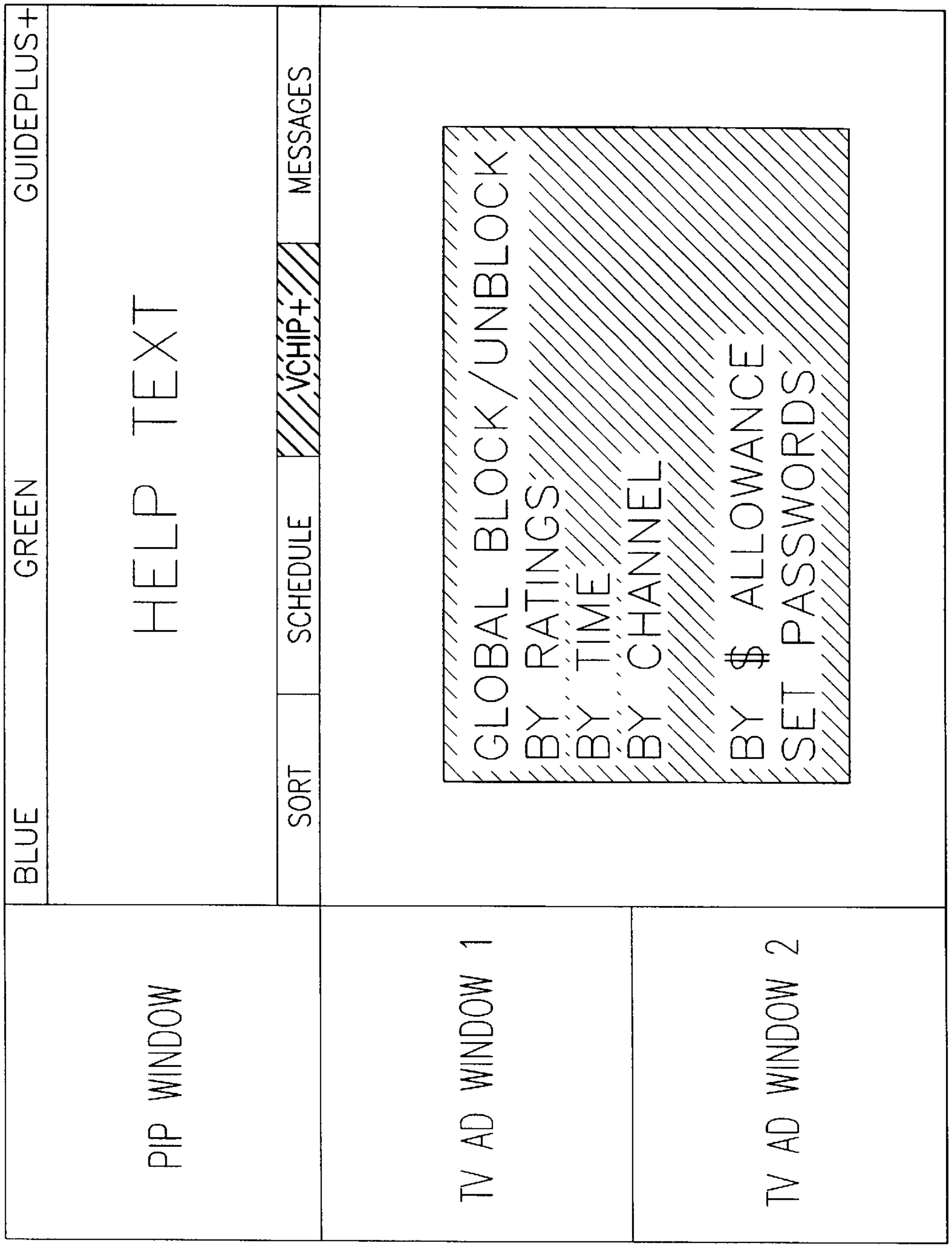
FIG. 15 is a television screen in PIP format displaying a viewer selection from the V-Chip Plus+In-Guide User Interface Main Blocking Menu of the "By Time Allowance" option.

By selecting the "By Time Allowance" option, the user enters the "By Time Allowance" interface screen. FIG. 15 shows a television screen in PIP format displaying the V-Chip Plus+In-Guide User Interface "By Time Allowance" interface screen and sample viewer-defined blocking selections.

In the "By Time Allowance" interface screen, the Master/Administrator selects a user from the user pull down menu. The user pull down menu lists all of the users entered in the user database. The Master/Administrator uses the up/down arrow keys on the Master/Administrator's remote control device to scroll up and down the user pull down menu. The Master/Administrator selects a particular user's name. The Master/Administrator must then enter the appropriate password for the Master/Administrator. When the password is accepted, the password tile turns green. Password acceptance is required to allow the Master/Administrator access to the Time Allowance tiles.

In the "By Time Allowance" interface screen, the Master/Administrator uses the up/down and left/right arrow keys to scroll through the various days of the week and to set time allowances for the particular days and for the entire week. The Master/Administrator uses the Blue action button on the Guide Plus+task bar to select each day of the week, or the entire week, for which a time allowance is to be set. The Master/Administrator presses the Blue action button on the Guide Plus+task bar to allow input of time allowance. Time allowance is then entered using the numeric keys of the Master/Administrator's remote control device. The Master/Administrator can press the Blue action button on the Guide Plus+task bar to add ½ hour increments, with each subsequent press of the Blue action button. The tile for a day or for the week with a time allowance turns RED. Pressing the Green action button on the Guide Plus+task bar clears all settings on this screen. The daily allowances can sum to a higher number than the total weekly allowance. Once the weekly allowance is reached by the viewing user, television viewing will be blocked for that user for the rest of the week even if the daily allowance for a particular day has not been exceeded. The V-Chip Help Text portion of the Guide Plus+screen provides help explanations for the feature currently highlighted by the remote control selection.

The Master/Administrator can then select another user name and set time allowances for each user subsequently selected. Changes are accepted when the Master/Administrator leaves the "By Time Allowance" interface screen by returning to the Main Blocking Menu.

Figure 16:
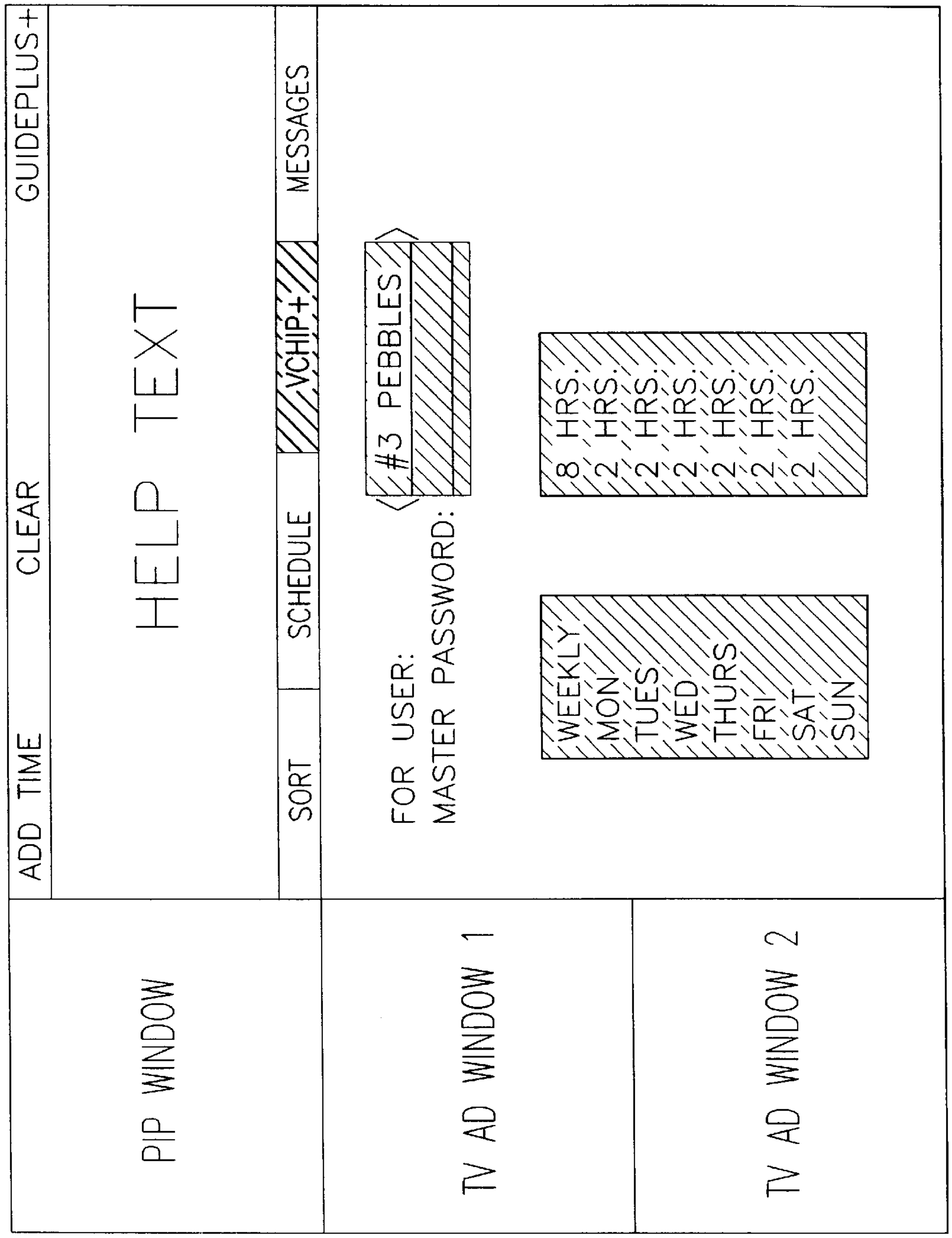
FIG. 16 is a television screen in PIP format displaying the V-Chip Plus+In-Guide User Interface "By Time Allowance" interface screen and sample viewer-defined blocking selections.

Once the viewer has completed entering user-level "Time Allowances," the viewer can return to the Main Blocking Menu by using the up/down arrow keys to highlight V-CHIP+ on the menu bar. The "By Time Allowance" tile on the Main Blocking Menu will be RED, indicating that Time Allowances have been set. FIG. 16 shows a television screen in PIP format displaying confirmation that Time Allowances have been set by RED highlighting on the V-Chip Plus+In-Guide User Interface Main Blocking Menu of the "By Time Allowance" option.

"By $ Allowance" Blocking

Figure 17:
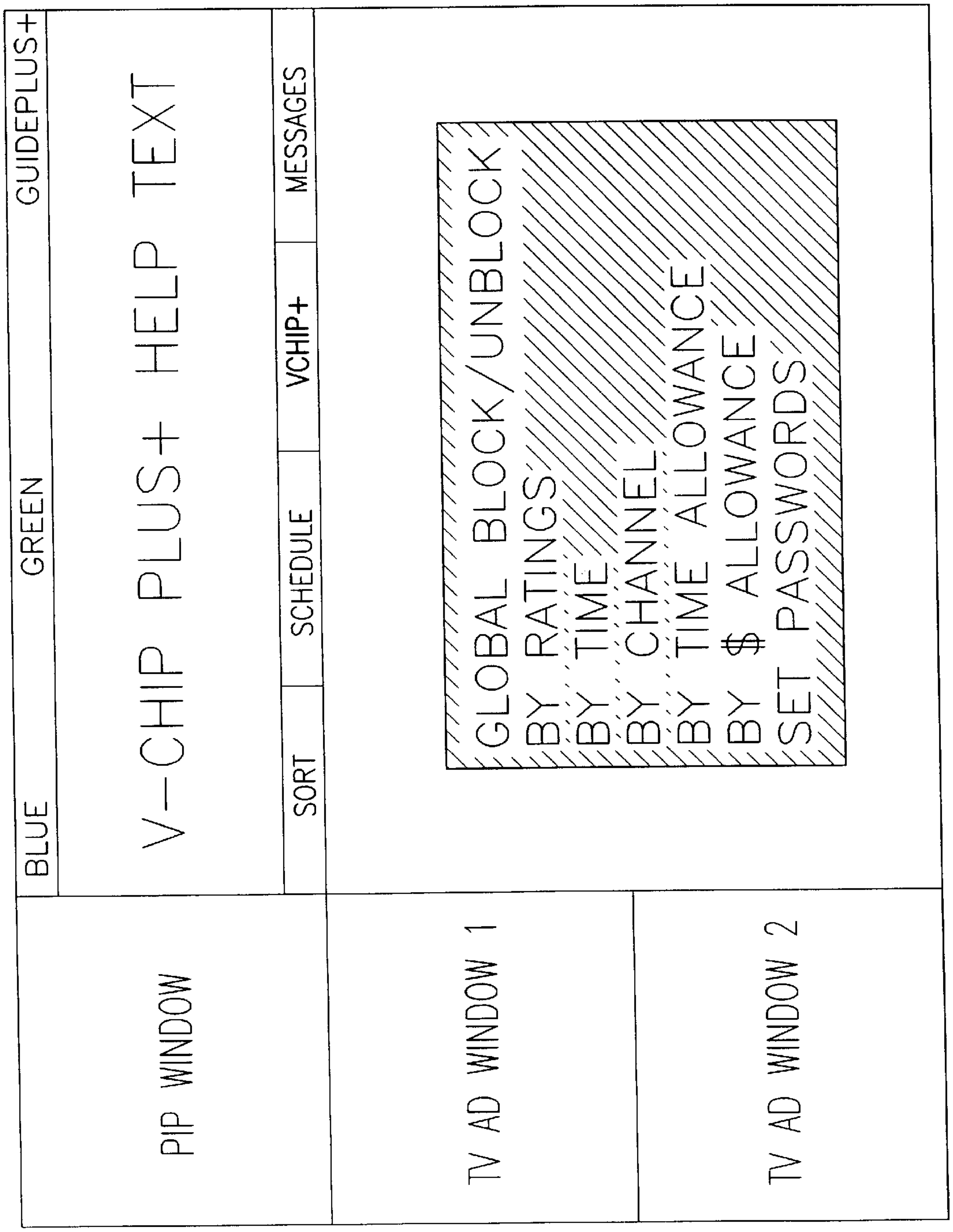
FIG. 17 is a television screen in PIP format displaying confirmation that By Time Allowance Blocking has been set by RED highlighting on the V-Chip Plus+In-Guide User Interface Main Blocking Menu of the "By Time Allowance" option.

The Master/Administrator can set user-level Pay-Per-View viewing dollar ("$") allowances for each user by day of the week or for an entire week. Television viewing will be blocked if the daily viewing dollar amount by the viewing user meets or exceeds the dollar allowance for the particular day of the week for that user. Television viewing will be blocked if the summation of the daily viewing dollar allowance by the viewing user meets or exceeds the weekly dollar allowance for that user. FIG. 17 shows a television screen in PIP format displaying a viewer selection from the V-Chip Plus+In-Guide User Interface Main Blocking Menu of the "By $ Allowance" option.

Figure 18:
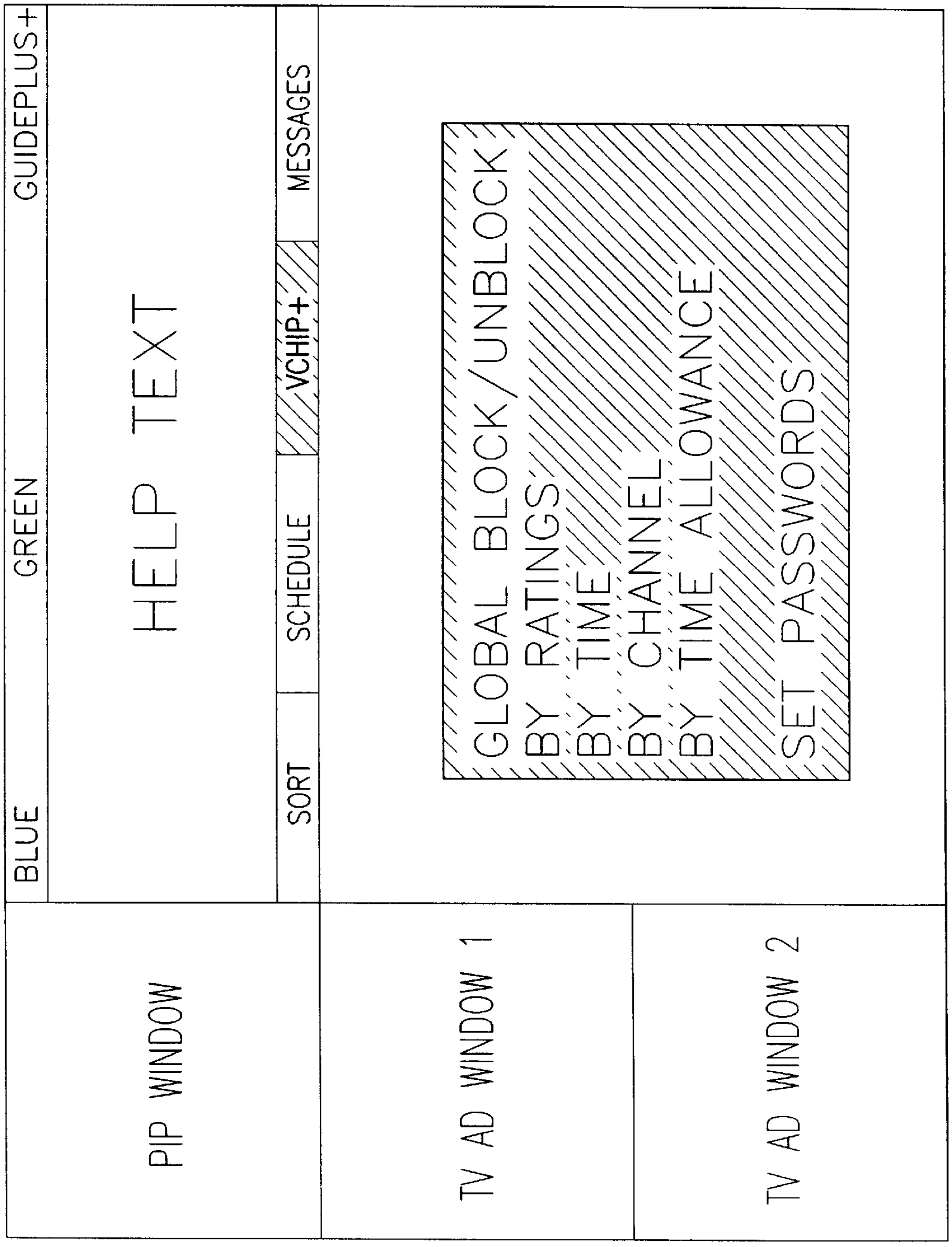
FIG. 18 is a television screen in PIP format displaying a viewer selection from the V-Chip Plus+In-Guide User Interface Main Blocking Menu of the "By $ Allowance" option.

By selecting the "By $ Allowance" option, the user enters the "By $ Allowance" interface screen. FIG. 18 shows a television screen in PIP format displaying the V-Chip Plus+ In-Guide User Interface "By $ Allowance" interface screen and sample viewer-defined blocking selections.

In the "By $ Allowance" interface screen, the Master/Administrator selects a user from the user pull down menu. The user pull down menu lists all of the users entered in the user database. The Master/Administrator uses the up/down arrow keys on the Master/Administrator's remote control device to scroll up and down the user pull down menu. The Master/Administrator selects a particular user's name. The Master/Administrator must then enter the appropriate password for the Master/Administrator. When the password is accepted, the password tile turns green. Password acceptance is required to allow the Master/Administrator access to the $ Allowance tiles.

In the "By $ Allowance" interface screen, the Master/Administrator uses the up/down and left/right arrow keys to scroll through the various days of the week and to set $ allowances for the particular days and for the entire week. The Master/Administrator uses the Blue action button on the Guide Plus+task bar to select each day of the week, or the entire week, for which a $ allowance is to be set. The Master/Administrator presses the Blue action button on the Guide Plus+task bar to allow input of $ allowance limitations. Dollar allowance is then entered using the numeric keys of the Master/Administrator's remote control device. The Master/Administrator can press the Blue action button on the Guide Plus+task A bar to add 50 cent increments, with each subsequent press of the Blue action button. The tile for a day or for the week with a $ allowance turns RED. Pressing the Green action button on the Guide Plus+task bar clears all settings on this screen. The daily allowances can sum to a higher amount than the total weekly allowance. Once the weekly $ allowance is reached by the viewing user, Paid-Per-View television viewing will be blocked for that user for the rest of the week even if the daily $ allowance for a particular day has not been met or exceeded. The V-Chip Help Text portion of the Guide Plus+screen provides help explanations for the feature currently highlighted by the remote control selection.

The Master/Administrator can then select another user name and set $ allowances for each user subsequently selected. Changes are accepted when the Master/Administrator leaves the "By $ Allowance" interface screen by returning to the Main Blocking Menu.

Figure 19:
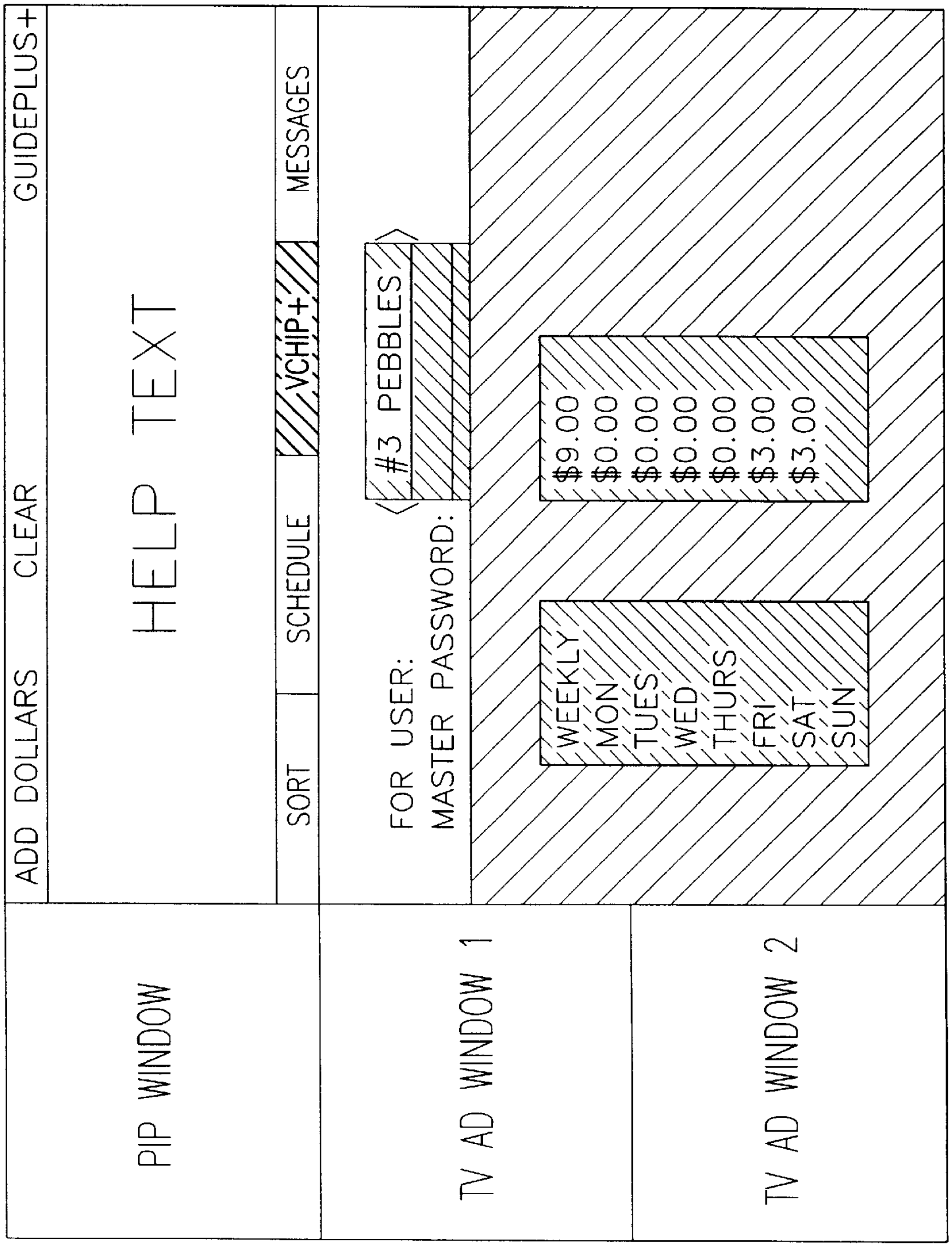
FIG. 19 is a television screen in PIP format displaying the V-Chip Plus+In-Guide User Interface "By $ Allowance" interface screen and sample viewer-defined blocking selections.

Once the viewer has completed entering user-level "$ Allowances," the viewer can return to the Main Blocking Menu by using the up/down arrow keys to highlight V-CHIP+on the menu bar. The "By $ Allowance" tile on the Main Blocking Menu will be RED, indicating that $ Allowances have been set. FIG. 19 shows a television screen in PIP format displaying confirmation that $ Allowances have been set by RED highlighting on the V-Chip Plus+In-Guide User Interface Main Blocking Menu of the "By $ Allowance" option.

Global Block/Unblock

Figure 20:
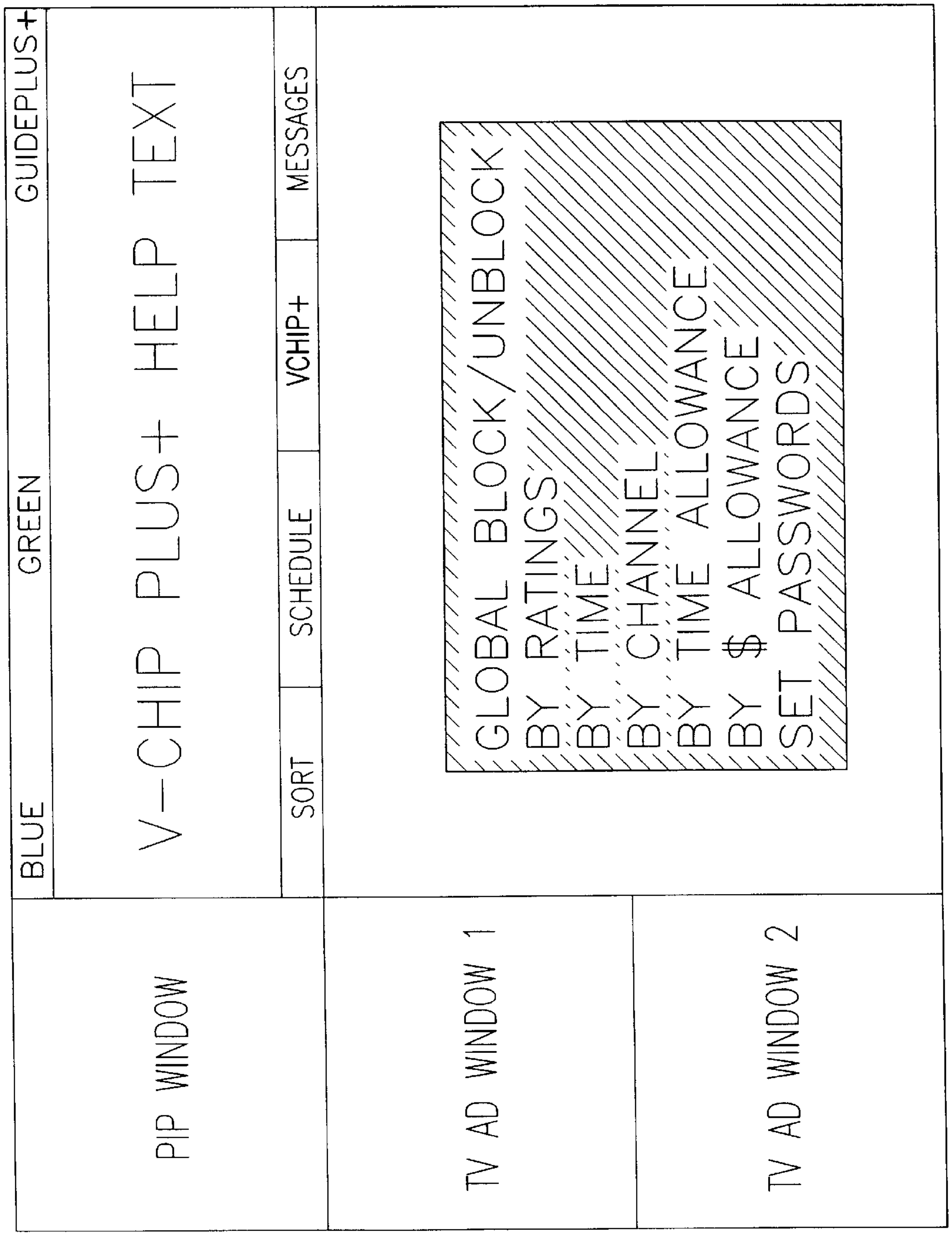
FIG. 20 is a television screen in PIP format displaying confirmation that By $ Allowance Blocking has been set by RED highlighting on the V-Chip Plus+In-Guide User Interface Main Blocking Menu of the "By $ Allowance" option.
Figure 21:
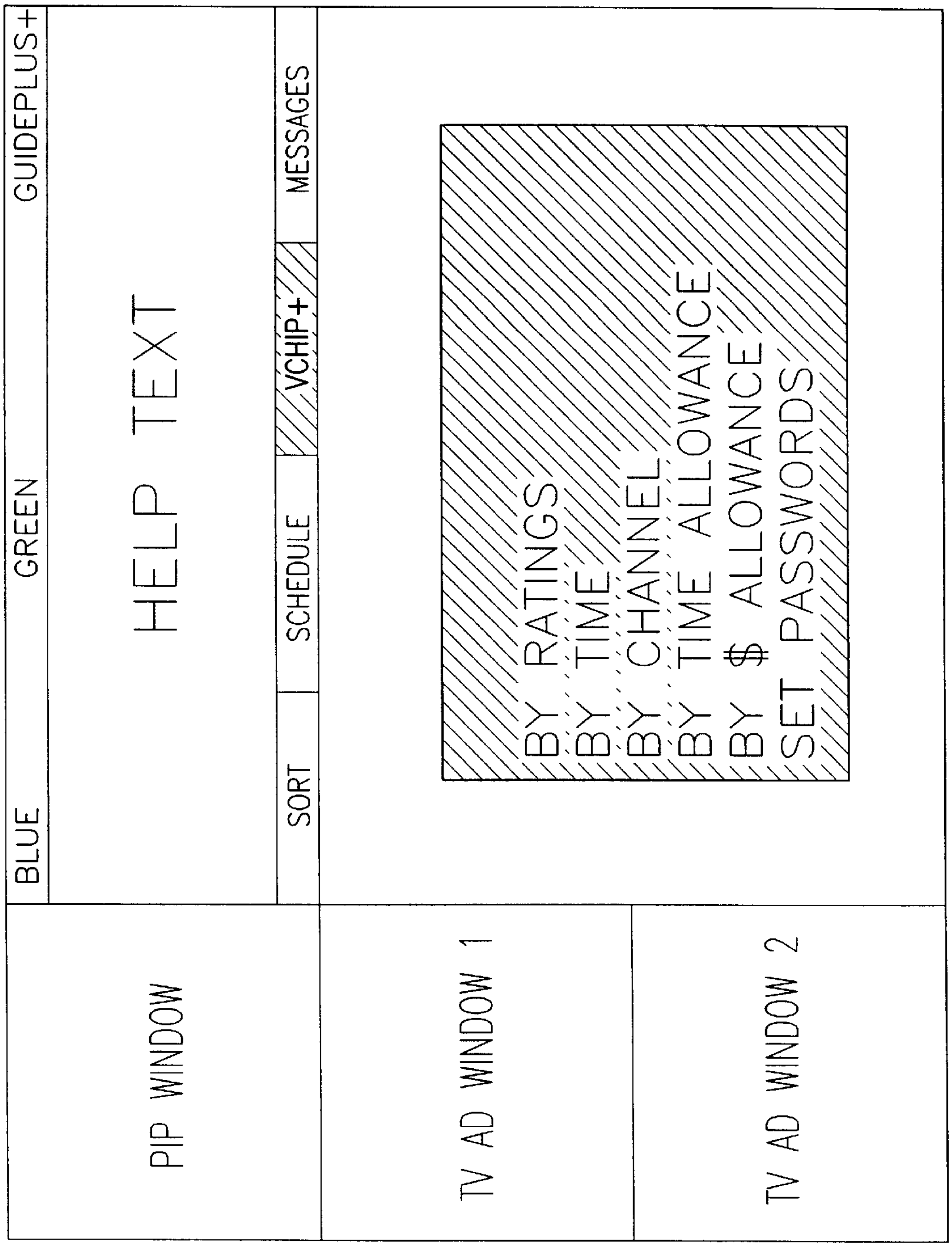
FIG. 21 is a television screen in PIP format displaying a viewer selection from the V-Chip Plus+In-Guide User Interface Main Blocking Menu of the "Global Block/Unblock" option.

The Master/Administrator, and only the Master/Administrator, can use the Global Block/Unblock instruction. FIG. 20 shows a television screen in PIP format displaying a viewer selection from the V-Chip Plus+In-Guide User Interface Main Blocking Menu of the "Global Block/Unblock" option. Turning to FIG. 21, a television screen is shown in PIP format displaying the V-Chip Plus+ In-Guide User Interface "Global Block/Unblock" interface screen and sample viewer input of user identification and password. In the "Global Block/Unblock" interface screen, the Master/Administrator is prompted for the Master/Administrator's password. Acceptance of the password allows the Master/Administrator to use the Global Block/Unblock instruction. Global Block/Unblock is a toggle switch override command that allows the Master/Administrator to temporarily override all blocking instructions. Using the Global Block/Unblock command does not destroy all of the blocking instructions. The blocking instructions remain in memory. The Master/Administrator can globally unblock all previously set instructions to view programming without any blocking. The Master/Administrator can then globally reset all blocking instructions.

Time and $ Allowance Accumulation and Blocking

Figure 22:
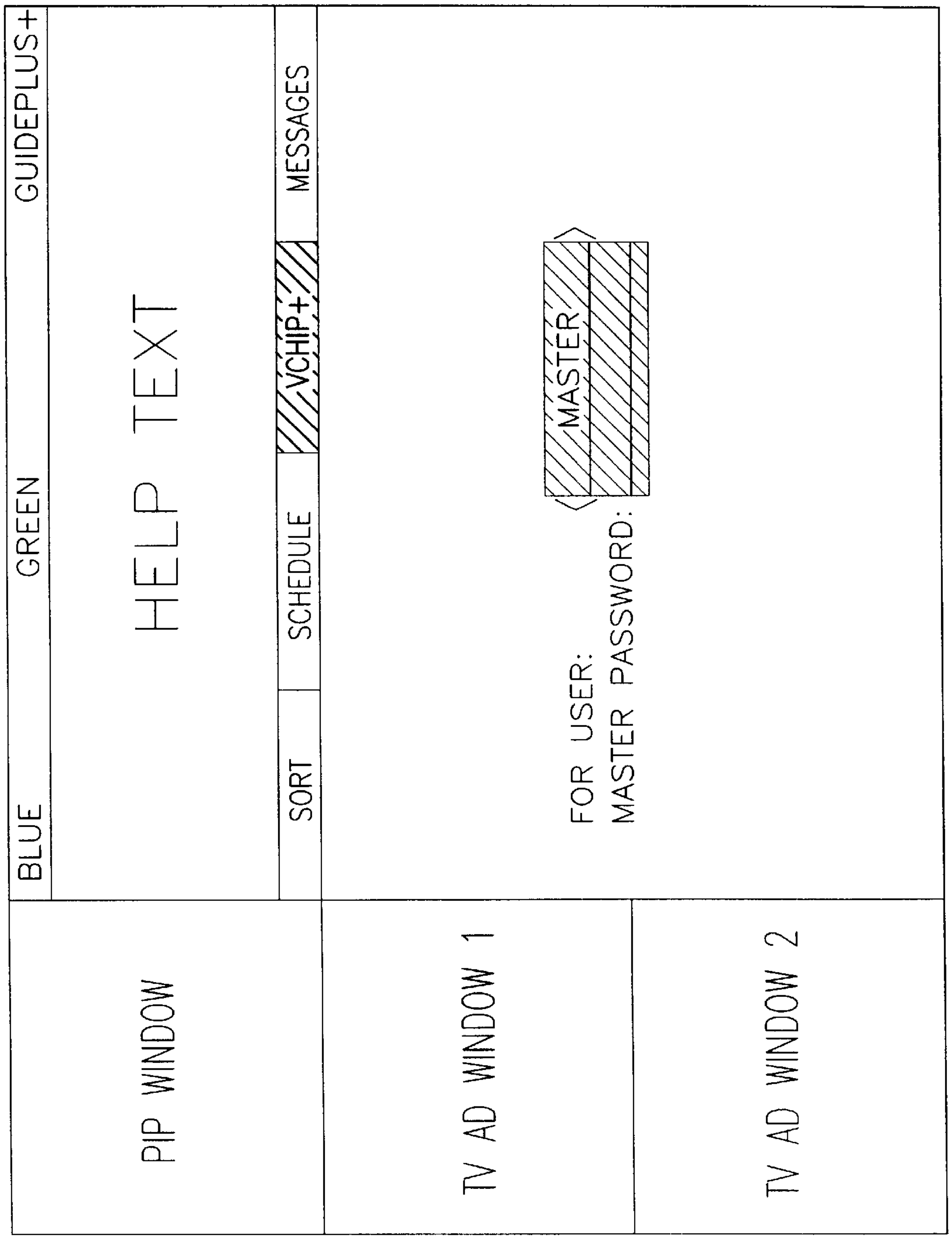
FIG. 22 is a television screen in PIP format displaying the V-Chip Plus+In-Guide User Interface "Global Block/Unblock" interface screen and sample viewer input of user identification and password.

Turning to FIG. 22, a television screen is shown in PIP format displaying a sample V-Chip Plus+In-Guide User Interface Main Blocking Menu format that will appear after any Time Allowance or $ Allowance blocking has been set. This screen will automatically appear each time that the television is turned on. The screen prompts the viewer for the viewer's "User" identification and for that "User's" password.

The time that the television is viewed by that user is then accumulated. Accumulated viewing times are compared at periodic time intervals to the time allowances set for that user. If the user's accumulated viewing time meets or exceeds the time allowance for that day, or for the week, the V-Chip Plus+In-Guide User Interface system sends blocking instructions to a program viewing blocking system, such as is claimed in co-pending U.S. Provisional Patent Application Ser. No. 60/076,290 titled V-Chip Plus: Parental Control Apparatus and Method, the disclosures of which have been previously incorporated by reference as if set forth in full herein, to block that user from further viewing.

Pay-Per-View dollar amounts agreed to by that user are accumulated. Accumulated Pay-Per-View dollar amounts agreed to by that user are then compared to that user's $ Allowances, by day, and for the week. The $ amount comparison is made each time that the user attempts to select a Pay-Per-View program. If the user's $ Allowance has been met or exceeded, the V-Chip Plus+In-Guide User Interface system sends blocking instructions to a program viewing blocking system, such as is claimed in co-pending U.S. Provisional Patent Application Ser. No. 60/076,290 titled V-Chip Plus: Parental Control Apparatus and Method, the disclosures of which have been previously incorporated by reference as if set forth in full herein, to block that user from further viewing.

Illustrative Embodiments

The embodiments of the invention described herein are only considered to be preferred and/or illustrative of the inventive concept; the scope of the invention is not to be restricted to such embodiments. Various and numerous other arrangements may be devised by one skilled in the art without departing from the spirit and scope of this invention. For example, a variety of different on screen display color schemes can be used to communicate various selections and options to the viewer/user.

What is claimed is:

1. A system for restricting access to television programs comprising:

an input for accepting cursor movement and selection commands;

a display that depicts a two dimensional matrix composed of rows and columns of tiles, wherein either the rows of tiles or the columns of tiles correspond to overall program ratings and either the rows of tiles or the columns of tiles correspond to specific program content indications and depicts highlighting of individual tiles or groups of tiles based on the cursor movement commands; and means for blocking or allowing viewing of television programs based on the overall program ratings and specific content ratings of the rows and columns corresponding to the highlighted tiles when a selection command is entered into the input.

2. The system of claim 1 wherein the overall program ratings comprise one or more of group of TV-Y, TV-Y7, TV-G, TV-PG, TV-14, TV-MA, G, PG, PG-13, R, NC-17 and X.

3. The system of claim 2 wherein the specific program content indication comprises one or more of the group of L, language, V, violence, MV, mild violence, FV, fantasy violence, BN, brief nudity, N, nudity, S, sexual content, AS, adult situations, D, and suggestive dialog.

4. The system of claim 1 wherein the specific program content indication comprises one or more of the group of L, language, V, violence, MV, mild violence, FV, fantasy violence, BN, brief nudity, N. nudity, S, sexual content, AS, adult situations, D, and suggestive dialog.

5. The system of claim 1 wherein the display depicts a main blocking menu which allows a user to block or enable viewing of programs globally, or to block or enable viewing of programs by Rating/content codes, Time, Channel, Time Allowance, pay-per-View dollar Allowance and by Grid Selection from an electronic television program schedule grid guide.

6. The system of claim 1 wherein the display depicts a menu including lists of users entered in a user A database, and a combination of highlighted individual titles or group of titles of the matrix varying according to user.

7. The system of claim 1 wherein the overall program ratings are listed along a column of the matrix, each program rating having rows corresponding to one or more specific program content indications.

8. The system of claim 7 wherein a title corresponding to one of the overall program ratings is activated or deactivated to block or enable a particular program rating.

9. The system of claim 7 wherein a title corresponding to one of specific program content indications is activated or deactivated to block or enable a particular program content indication.

10. The system of claim 1 wherein the means for blocking or allowing viewing comprises a circuitry connected between a television signal input and the display.

11. A method of restricting access to television programs comprising:

inputting cursor movement and selection commands;

displaying a two dimensional matrix composed of rows and columns of tiles, wherein either the rows of tiles or the columns of tiles correspond to overall program ratings and either the rows of tiles or the columns of tiles correspond to specific program content indications and depicts highlighting of individual tiles or groups of tiles based on the cursor movement commands; and blocking or allowing viewing of television programs based on the overall program ratings and specific content ratings of the rows and columns corresponding the highlighted tiles when a selection command is entered into the input.

12. The method of claim 11 further comprising activating or deactivating a title corresponding to one of the overall program ratings to block or enable a particular program rating.

13. The method of claim 11 further comprising activating or deactivating a title corresponding to one of specific program content indications to block or enable a particular program content indication.

* * * * *

US006701523C1

(12) EX PARTE REEXAMINATION CERTIFICATE (10591st)

United States Patent

Hancock et al.

(10) Number: US 6,701,523 C1

(45) Certificate Issued: May 11, 2015

(54) V-CHIP PLUG+IN-GUIDE USER INTERFACE APPARATUS AND METHOD FOR PROGRAMMABLE BLOCKING OF TELEVISION AND OTHER VIEWABLE PROGRAMMING, SUCH AS FOR PARENTAL CONTROL OF A TELEVISION RECEIVER

(75) Inventors: Kenneth Hancock, Mashua, NH (US); Thomas Ward, Bedford, MA (US); Douglas Macrae, Weston, MA (US); Jacques Hugon, Bedford, MA (US)

(73) Assignees: ALL MEDIA GUIDE, LLC, Santa Clara, CA (US); APTIV DIGITAL, INC., Santa Clara, CA (US); GEMSTAR DEVELOPMENT CORPORATION, Santa Clara, CA (US); INDEX SYSTEMS INC., Santa Clara, CA (US); ODS PROPERTIES, INC., Santa Clara, CA (US); ROVI DATA SOLUTIONS, INC., Santa Clara, CA (US); ROVI GUIDES, INC., Santa Clara, CA (US); ROVI SOLUTIONS CORPORATION, Santa Clara, CA (US); ROVI SOLUTIONS LIMITED, Santa Clara, CA (US); ROVI TECHNOLOGIES CORPORATION, Santa Clara Boulevard, CA (US); STARSIGHT TELECAST, INC., Santa Clara, CA (US); TV GUIDE, INC., Santa Clara, CA (US); TV GUIDE ONLINE, LLC, Santa Clara, CA (US); UNITED VIDEO PROPERTIES, INC., Santa Clara, CA (US)

Reexamination Request:

No. 90/011,528, Mar. 3, 2011

No. 90/011,550, Apr. 13, 2011

Reexamination Certificate for:

| | |
|---|---|
| Patent No.: | **6,701,523** |
| Issued: | **Mar. 2, 2004** |
| Appl. No.: | **09/398,963** |
| Filed: | **Sep. 16, 1999** |

Related U.S. Application Data

(60) Provisional application No. 60/100,575, filed on Sep. 16, 1998, provisional application No. 60/085,401, filed on May 13, 1998.

(51) Int. Cl.

| | |
|---|---|
| *H04N 7/087* | (2006.01) |
| *H04N 7/16* | (2011.01) |
| *H04N 7/088* | (2006.01) |
| *H04N 5/445* | (2011.01) |
| *H04N 21/431* | (2011.01) |
| *H04N 21/475* | (2011.01) |
| *H04N 21/45* | (2011.01) |

(52) U.S. Cl.

CPC ....... *H04N 21/4316* (2013.01); *H04N 21/4751* (2013.01); *H04N 5/44543* (2013.01); *H04N 21/4532* (2013.01); *H04N 7/0887* (2013.01); *H04N 7/163* (2013.01); *H04N 21/4755* (2013.01)

(58) Field of Classification Search

None

See application file for complete search history.

(56) References Cited

To view the complete listing of prior art documents cited during the proceedings for Reexamination Control Numbers 90/011,528 and 90/011,550, please refer to the USPTO's public Patent Application Information Retrieval (PAIR) system under the Display References tab.

*Primary Examiner* — Luke S Wassum

(57) ABSTRACT

A system for restricting access to television programs comprising an input for accepting cursor movement and selection commands. The system includes a display that depicts a two dimensional matrix composed of rows and columns of tiles, wherein either the rows of tiles or the columns of tiles correspond to overall program ratings and either the rows of tiles or the columns of tiles correspond to specific program content indications and depicts highlighting of individual tiles or groups of tiles based on the cursor movement commands. The system further includes means for blocking or allowing viewing of television programs based on the overall program ratings and specific content ratings of the rows and columns corresponding the highlighted tiles when a selection command is entered into the input.

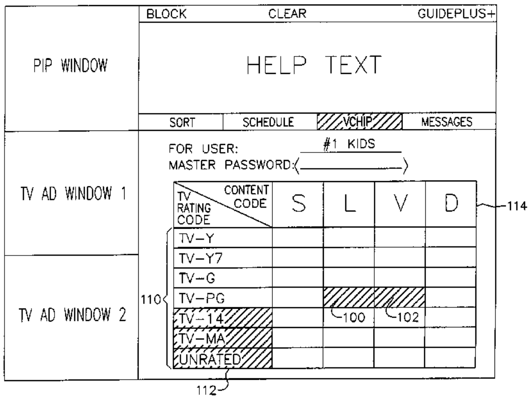

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-13 are cancelled.

* * * * *